(12) United States Patent
Fujikawa et al.

(10) Patent No.: US 9,188,834 B2
(45) Date of Patent: Nov. 17, 2015

(54) WAVELENGTH CONVERSION CRYSTAL AND WAVELENGTH CONVERSION LASER DEVICE

(75) Inventors: Shuichi Fujikawa, Tokyo (JP); Susumu Konno, Tokyo (JP); Keisuke Furuta, Tokyo (JP); Tomotaka Katsura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 14/007,469

(22) PCT Filed: Mar. 13, 2012

(86) PCT No.: PCT/JP2012/056350
§ 371 (c)(1),
(2), (4) Date: Sep. 25, 2013

(87) PCT Pub. No.: WO2012/132866
PCT Pub. Date: Oct. 4, 2012

(65) Prior Publication Data
US 2014/0016186 A1  Jan. 16, 2014

(30) Foreign Application Priority Data
Mar. 28, 2011 (JP) .................. 2011-069303

(51) Int. Cl.
*G02F 1/35* (2006.01)
*G02F 1/37* (2006.01)
(Continued)

(52) U.S. Cl.
CPC .............. *G02F 1/37* (2013.01); *G02F 1/3551* (2013.01); *H01S 3/109* (2013.01);
(Continued)

(58) Field of Classification Search
CPC ......... H04B 10/677; G02F 2/002; G02F 1/37; G02F 1/3558; G02F 1/015; G02F 1/365; B82Y 20/00

USPC ................... 359/325, 326, 240, 328; 385/122
See application file for complete search history.

(56) References Cited

U.S. PATENT DOCUMENTS 4,997,244 A * 3/1991 Nishio et al. .................. 359/328
5,341,393 A * 8/1994 Okazaki et al. ................. 372/69
(Continued)

FOREIGN PATENT DOCUMENTS

| JP | 6 194705 | 7/1994 |
|---|---|---|
| JP | 6 216453 | 8/1994 |

(Continued)

OTHER PUBLICATIONS

International Search Report Issued Jun. 19, 2012 in PCT/JP12/056350 Filed Mar. 13, 2012.

(Continued)

*Primary Examiner* — Ellen Kim
(74) *Attorney, Agent, or Firm* — Oblon, McClelland, Maier & Neustadt, L.L.P.

(57) ABSTRACT

A wavelength conversion crystal including: a single nonlinear optical crystal which satisfies both of a first phase-matching condition and a second phase-matching condition, the first phase-matching condition being required for first wavelength conversion to convert a fundamental wave having a wavelength of 1064 nm into a second harmonic having a wavelength of 532 nm, and the second phase-matching condition being required for second wavelength conversion to convert the light having a wavelength of 532 nm into a fourth harmonic having a wavelength of 266 nm; and a first reflective face and a second reflective face for reflecting the light having a wavelength of 532 nm generated by the first wavelength conversion to supply it to the second wavelength conversion. This approach can efficiently generate a third or higher-order harmonic with a reliable and simple configuration.

10 Claims, 13 Drawing Sheets

(51) Int. Cl.
*G02F 1/355* (2006.01)
*H01S 3/109* (2006.01)
*H01S 3/08* (2006.01)
*H01S 3/081* (2006.01)
*H01S 3/082* (2006.01)
*H01S 3/0941* (2006.01)
*H01S 3/117* (2006.01)
*H01S 3/16* (2006.01)
*H01S 3/00* (2006.01)

(52) U.S. Cl.
CPC ........ *G02F 2001/354* (2013.01); *H01S 3/0092* (2013.01); *H01S 3/082* (2013.01); *H01S 3/0815* (2013.01); *H01S 3/08054* (2013.01); *H01S 3/08059* (2013.01); *H01S 3/0941* (2013.01); *H01S 3/117* (2013.01); *H01S 3/1611* (2013.01); *H01S 3/1643* (2013.01)

(56) References Cited

U.S. PATENT DOCUMENTS

| | | | |
|---|---|---|---|
| 5,777,788 | A | 7/1998 | Noguchi |
| 5,892,749 | A * | 4/1999 | Yamanaka ............... 369/112.17 |
| 6,172,800 | B1 | 1/2001 | Kouta |
| 6,215,580 | B1 * | 4/2001 | Kouta ........................... 359/328 |
| 6,551,528 | B1 | 4/2003 | Sasaki et al. |
| 8,587,863 | B2 * | 11/2013 | Wakabayashi et al. ....... 359/328 |
| 8,773,750 | B2 * | 7/2014 | Chen et al. .................... 359/328 |
| 8,934,510 | B2 * | 1/2015 | Kakizaki et al. ................ 372/20 |
| 2009/0279573 | A1 * | 11/2009 | Mizuuchi et al. .................. 372/6 |

FOREIGN PATENT DOCUMENTS

| | | |
|---|---|---|
| JP | 08-248226 A | 9/1996 |
| JP | 11 038458 | 2/1999 |
| JP | 2000 221550 | 8/2000 |
| JP | 2001 75135 | 3/2001 |
| JP | 2009 145791 | 7/2009 |

OTHER PUBLICATIONS

International Preliminary Report on Patentability with Written Opinion issued Oct. 10, 2013, in International Application No. PCT/JP2012/056350.

Combined Office Action and Search Report issued Dec. 22, 2014 in Taiwanese Patent Application No. 101109615 (with partial English language translation and English Translation of Category of Cited Documents).

Office Action issued Aug. 5, 2014 in Japanese Patent Application No. 2013-507350 (with English language translation).

Office Action issued on Aug. 13, 2015 in Chinese Patent Application No. 201280015298.2, along with its English translation.

* cited by examiner

WAVELENGTH CONVERSION CRYSTAL AND WAVELENGTH CONVERSION LASER DEVICE

TECHNICAL FIELD

The present invention relates to a wavelength conversion crystal for emitting a third or higher-order harmonic and a wavelength conversion laser device using the same.

BACKGROUND

In a conventional case of emitting third and higher-order harmonics, a configuration of using not only a first wavelength conversion crystal for emitting a second harmonic but also a second wavelength conversion crystal for emitting a third or fourth harmonic has been generally employed.

However, such a configuration of using a plurality of wavelength conversion crystals requires not only a plurality of wavelength conversion crystals but also adjustment means for adjusting an angle and a temperature of each wavelength conversion crystal, and also other adjustment means for adjusting an incidence angle and an incident beam diameter of light to be wavelength-converted and to be incident on each wavelength conversion crystal. These requirements may raise costs required for the wavelength conversion crystals and the wavelength conversion laser device.

In addition, since it is required to adjust angles and temperatures of the plurality of wavelength conversion crystals and an incidence angle and a beam diameter of light to be wavelength-converted, the configuration has problems of not only requiring much time and effort for the adjusting works but also causing an output, a beam intensity distribution, and a beam diameter of a higher-order harmonic to easily fluctuate due to variation of an appropriate value of each of elements to be adjusted.

To address these problems, a technique of integrating the plurality of wavelength conversion crystals by using such a method as optical contact has been proposed (for example, see Patent Document 1). Also, another technique of emitting a third harmonic from a single wavelength conversion crystal by using a specific crystalline material has been proposed (for example, see Patent Document 2).

PRIOR ART DOCUMENT

Patent Document

[Patent Document 1] JP 11-38458 A
[Patent Document 2] JP 2000-221550 A

SUMMARY OF THE INVENTION

Problem to be Solved by the Invention

Conventionally, when a single wavelength conversion element is used to emit third and higher-order harmonics as described above, it is required to separately prepare a first wavelength conversion crystal for emitting a second harmonic and a second wavelength conversion crystal for emitting third and higher-order harmonics and to join the first wavelength conversion crystal and the second wavelength conversion crystal at an accurate angle by using such methods as optical contact. As a result, this approach not only requires significant cost and effort in manufacturing the wavelength conversion element but also has a problem in reliability of a junction between the crystals such as ablation of the junction due to a heat cycle, since the crystals having different coefficients of thermal expansion are joined.

Moreover, since the conventional configuration of using the single wavelength conversion element to emit third and higher-order harmonics has the first wavelength conversion crystal and the second wavelength conversion crystal having different refractive indices which are joined with each other, reflection loss occurs at the junction due to the Fresnel reflection and scattering light is generated according to a finishing state of the joint surface, resulting in decreased efficiency of wavelength conversion.

Further, a configuration of using a single wavelength conversion crystal to emit a third harmonic has been also conventionally disclosed. However, since the configuration uses a specific wavelength conversion crystal material, there remains a problem in that an available wavelength of the third harmonic is limited to a specific wavelength which are determined by the physical property of the wavelength conversion crystal material.

It is an object of the present invention to provide a wavelength conversion crystal which can efficiently generate a third or higher-order harmonic with a reliable and simple configuration and a wavelength conversion laser device using the same.

Means for Solving the Problem

In order to achieve the object, a wavelength conversion element according to a first aspect of the present invention may include:

a single wavelength conversion crystal which can satisfy both of a first phase-matching condition and a second phase-matching condition at the same temperature, the first phase-matching condition being required for first wavelength conversion to convert first wavelength light into second wavelength light, and the second phase-matching condition being required for second wavelength conversion to convert the second wavelength light into third wavelength light; and at least two reflective faces having different orientations, for reflecting the second wavelength light generated at least by the first wavelength conversion, wherein both of the first wavelength conversion and the second wavelength conversion are performed by allowing the propagation orientation and the polarization direction of the second wavelength light generated by the first wavelength conversion to coincide with those of the second phase-matching condition using at least twice reflection from said reflective faces.

It is preferable in the present invention that the normal directions of said reflective faces are set so that the polarization direction of the second wavelength light generated by the first wavelength conversion on the propagation path between said reflective faces formed on the wavelength conversion crystal is polarized to one of the ordinary ray and the extraordinary ray of the wavelength conversion crystal.

It is preferable in the present invention that the first wavelength conversion is to generate a second harmonic and the second wavelength conversion is to generate a fourth harmonic.

It is preferable in the present invention that the wavelength conversion crystal further can satisfy a third phase-matching condition which is required for third wavelength conversion to convert the fourth harmonic into a harmonic of higher-order than the fourth harmonic, and the wavelength conversion crystal further includes at least two reflective faces having different orientations, for reflecting at least the fourth harmonic, and the harmonic of higher-order than the fourth harmonic is generated by the third wavelength conversion by allowing the propagation orientation and the polarization direction of the fourth wavelength light generated by the second wavelength conversion to coincide with those of the third phase-matching condition using at least twice reflection from said reflective faces.

It is preferable in the present invention that the wavelength conversion crystal is a cesium lithium borate-based crystal.

Further, a wavelength conversion crystal according to a second aspect of the present invention may include:

a single wavelength conversion crystal which can satisfy both of a first phase-matching condition and a second phase-matching condition at the same temperature, the first phase-matching condition being required for first wavelength conversion to convert first wavelength light into second wavelength light, and the second phase-matching condition being required for second wavelength conversion to convert both of the first wavelength light and the second wavelength light into third wavelength light; and at least two reflective faces having different orientations, for reflecting both of the second wavelength light generated at least by the first wavelength conversion and the first wavelength light left after the first wavelength conversion, wherein both of the first wavelength conversion and the second wavelength conversion are performed by allowing the propagation orientation and the polarization direction of the second wavelength light generated by the first wavelength conversion and the propagation orientation and the polarization direction of the first wavelength light left after the first wavelength conversion to coincide with those of the second phase-matching condition using at least twice reflection from said reflective faces.

It is preferable in the present invention that the normal directions of said reflective faces are set so that the polarization direction of the second wavelength light generated by the first wavelength conversion on the propagation path between said reflective faces formed on the wavelength conversion crystal is polarized to one of the ordinary ray and the extraordinary ray of the wavelength conversion crystal.

It is preferable in the present invention that the first wavelength conversion is to generate a second harmonic and the second wavelength conversion is to generate a third harmonic.

It is preferable in the present invention that the wavelength conversion crystal further can satisfy a third phase-matching condition which is required for third wavelength conversion to convert the third harmonic into a harmonic of higher-order than the third harmonic, and the wavelength conversion crystal further includes at least two reflective faces having different orientations, for reflecting at least the third harmonic, and the harmonic of higher-order than the third harmonic is generated by the third wavelength conversion by allowing the propagation orientation and the polarization direction of the third wavelength light generated by the second wavelength conversion to coincide with those of the third phase-matching condition using at least twice reflection from said reflective faces.

It is preferable in the present invention that the wavelength conversion crystal is a lithium triborate crystal.

A wavelength conversion laser device according to a fourth aspect of the present invention may include:

a laser source which emits laser light; and any one of the wavelength conversion crystals as described above, for performing wavelength conversion of the laser light.

It is preferable in the present invention that the laser source includes an optical resonator and a laser medium located inside the optical resonator, and said wavelength conversion crystal is located inside the optical resonator, and an optical axis of the optical resonator is matched with at least the phase-matching orientation of the first wavelength conversion.

Effect of the Invention

According to the present invention, usage of the single wavelength conversion crystal which satisfies both of the first phase-matching condition for first wavelength conversion and the second phase-matching condition for second wavelength conversion and provision of the reflective face for supplying the second wavelength light generated by the first wavelength conversion to the second wavelength conversion can efficiently generate a third or higher-order harmonic with a reliable and simple configuration.

EMBODIMENT FOR CARRYING OUT THE INVENTION (Embodiment 1)

Figure 1:
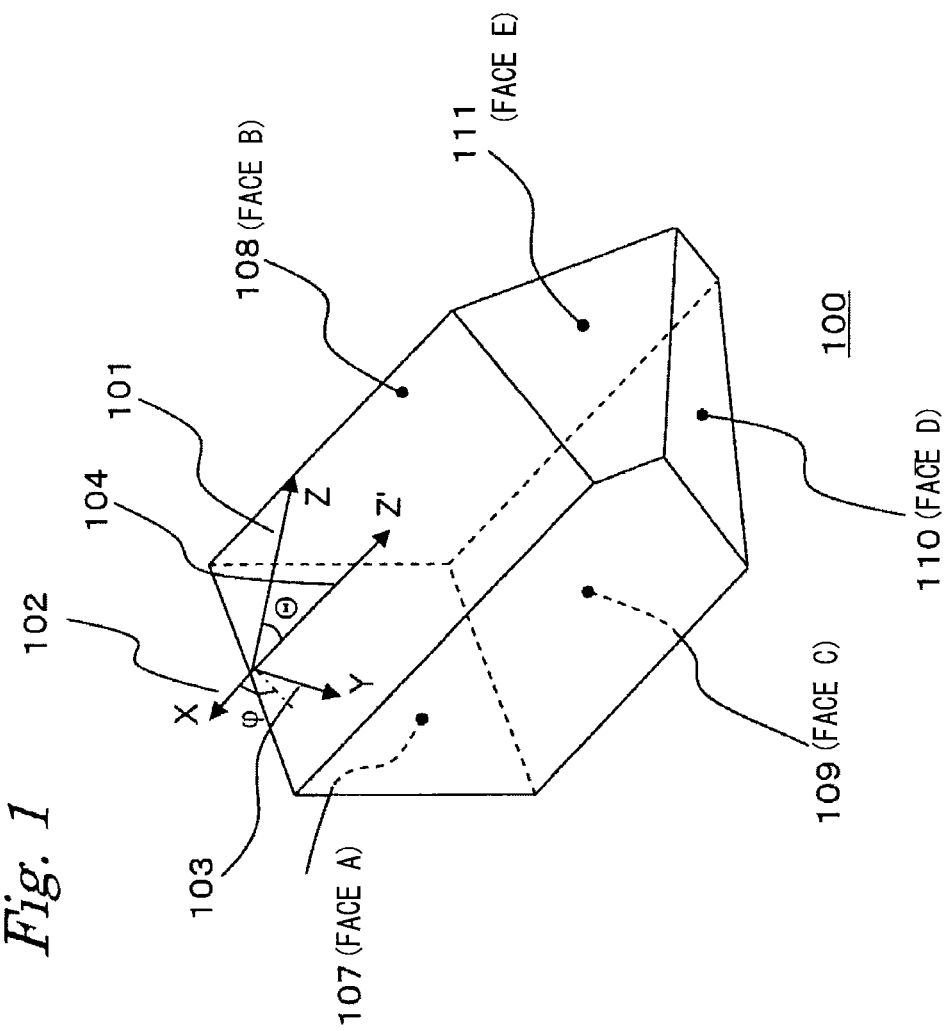
FIG. 1 is a perspective view illustrating a configuration of a wavelength conversion crystal according to Embodiment 1 of the present invention.

FIG. 1 is a perspective view illustrating a configuration of a wavelength conversion crystal 100 according to Embodiment 1 of the present invention. The wavelength conversion crystal 100 is a crystal which exhibits nonlinear optical effect, and a cesium lithium borate-based crystal (CLBO crystal: $CsLiB_6O_{10}$) is used by way of an example of the wavelength conversion crystal 100 in this embodiment. In FIG. 1, arrows 101, 102, and 103 represent Z-axis, X-axis, and Y-axis, respectively, which are dielectric principal axes of the CLBO crystal, and the Z-axis 101 corresponds to the optic axis of the CLBO crystal. An arrow 104 represents a Z'-axis corresponding to a main propagation direction of light in the wavelength conversion crystal 100.

In this embodiment, a type-I phase-matching orientation for first wavelength conversion which generates a second harmonic from a fundamental wave of the wavelength 1064 nm at the crystal temperature of 150° C. is $(\Theta, \phi)$=(29.4 deg, 45.0 deg) in a polar coordinates of $\Theta$, $\phi$ based on the dielectric principal axes. Further, a type-I phase-matching orientation for second wavelength conversion which generates a second harmonic from the fundamental wave of the wavelength 532 nm at the crystal temperature 150° C. is $(\Theta, \phi)$=(61.9 deg, 45.0 deg) in the polar coordinates of $\Theta$, $\phi$ based on the dielectric principal axes. Therefore, the orientation of the Z'-axis 104 is defined by the intermediate orientation between the phase-matching orientation for the first wavelength conversion and the phase-matching orientation for the second wavelength conversion as $(\Theta, \phi)$=(45.65 deg, 45.0 deg) in the polar coordinates of $\Theta$, $\phi$ based on dielectric principal axes.

A one end face 107 (face A) of the wavelength conversion crystal 100 is cut out so that the normal direction thereof coincides with the Z'-axis 104. In the drawing, a top face 108 (face B) of the wavelength conversion crystal 101 is a plane parallel to both of the phase-matching orientation for the first wavelength conversion and the phase-matching orientation for the second wavelength conversion, and in this embodiment the top face 108 (face B) is parallel to both of the Z-axis 101 which is the dielectric principal axis and the Z'-axis 104 which is the main propagation direction of light. A bottom face 109 (face C) of the wavelength conversion crystal 100 is formed to be parallel to the face B 108 which is the top face of the wavelength conversion crystal 100. A first reflective face 110 (face D) is formed on another end face of the wavelength conversion crystal 100, and a second reflective face 111 (face E) is formed on yet another end face of the wavelength conversion crystal 100.

Next, orientations of the respective faces formed on the wavelength conversion crystal 100 according to Embodiment 1 will be described in detail by using the Cartesian coordinate system XYZ and the polar coordinate system $\Theta\phi$ with respect to the dielectric principal axes of the wavelength conversion crystal 100. Here, the angle of deviation $\Theta$ is defined as an angle measured with respect to the Z-axis 101 which is one of the dielectric principal axes, and the angle of deviation $\phi$ is defined as an angle at which projection of an orientation to be described onto the XY-plane is measured with respect to the X-axis 102 which is one of the dielectric principal axes.

The normal direction of the face A 107, i.e., the orientation of the Z'-axis 104, is (X, Y, Z)=(0.5056, 0.5056, 0.6990) in terms of the Cartesian coordinate system XYZ and $(\Theta, \phi)$=(45.65 deg, 45.0 deg) in terms of the polar coordinate system $\Theta\phi$.

The normal direction of the face B 108 and the face C 109 which is parallel thereto is (X, Y, Z)=(0.7071, −0.7071, 0) in terms of the Cartesian coordinate system XYZ and $(\Theta, \phi)$=(90.0 deg, −45.0 deg) in terms of the polar coordinate system $\Theta\phi$.

The normal direction of the face D 110 is (X, Y, Z)=(−0.0458, 0.9419, 0.3327) in terms of the Cartesian coordinate system XYZ and $(\Theta, \phi)$=(70.57 deg, 92.78 deg) in terms of the polar coordinate system $\Theta\phi$.

The normal direction of the face E 111 is (X, Y, Z)=(0.7316, −0.1149, 0.6720) in terms of the Cartesian coordinate system XYZ and $(\Theta, \phi)$=(47.78 deg, −8.93 deg) in terms of the polar coordinate system $\Theta\phi$.

An anti-reflection coating for both of the wavelength 1064 nm and the wavelength 266 nm is applied to the face A 107 of the wavelength conversion crystal 100 according to this embodiment. A dual wavelength coating having a higher transmittance for the wavelength 1064 nm and a higher reflectance for the wavelength 532 nm is applied to the face D 110 and the face E 111.

Figure 2:
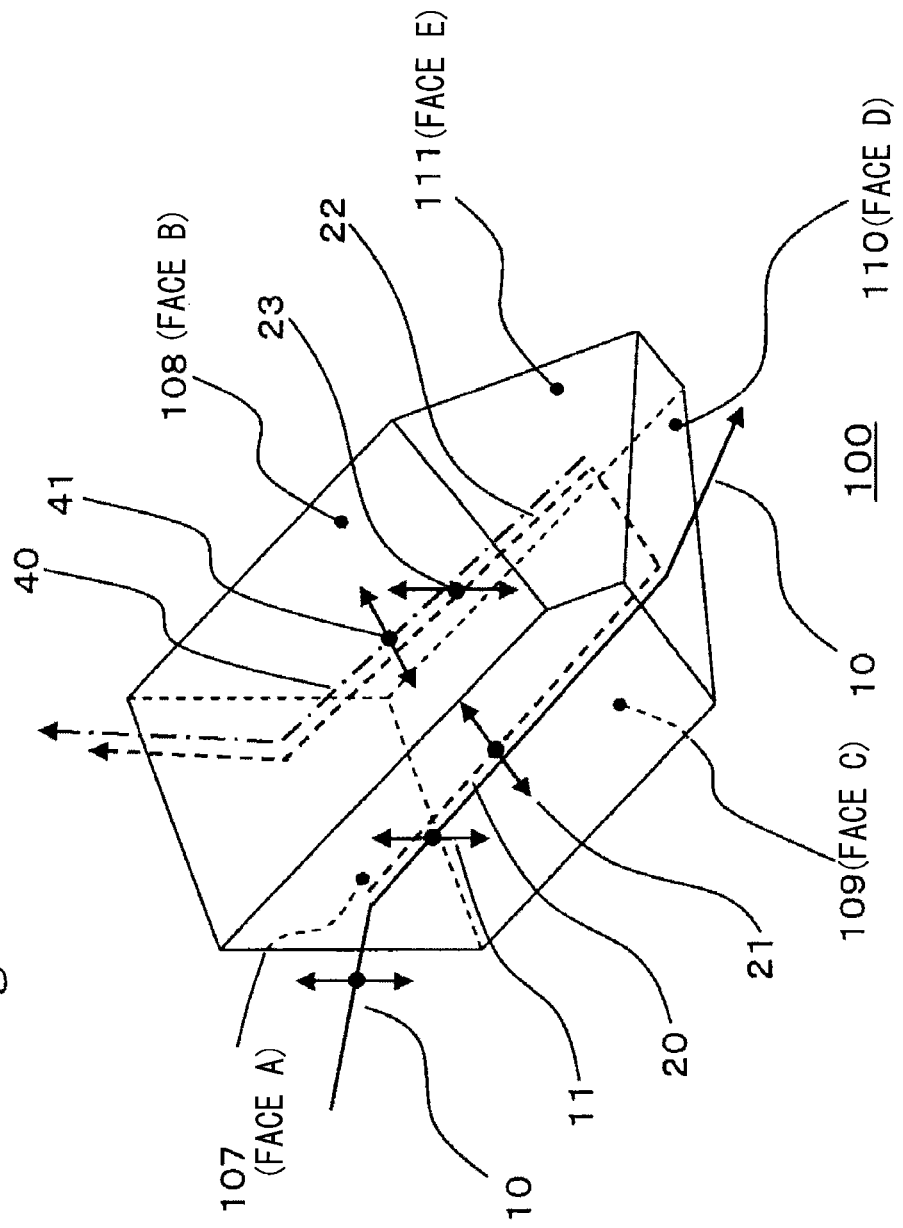
FIG. 2 is a perspective view schematically illustrating a propagation direction and a polarization direction of light in the wavelength conversion crystal according to Embodiment 1 of the present invention.
Figure 3:
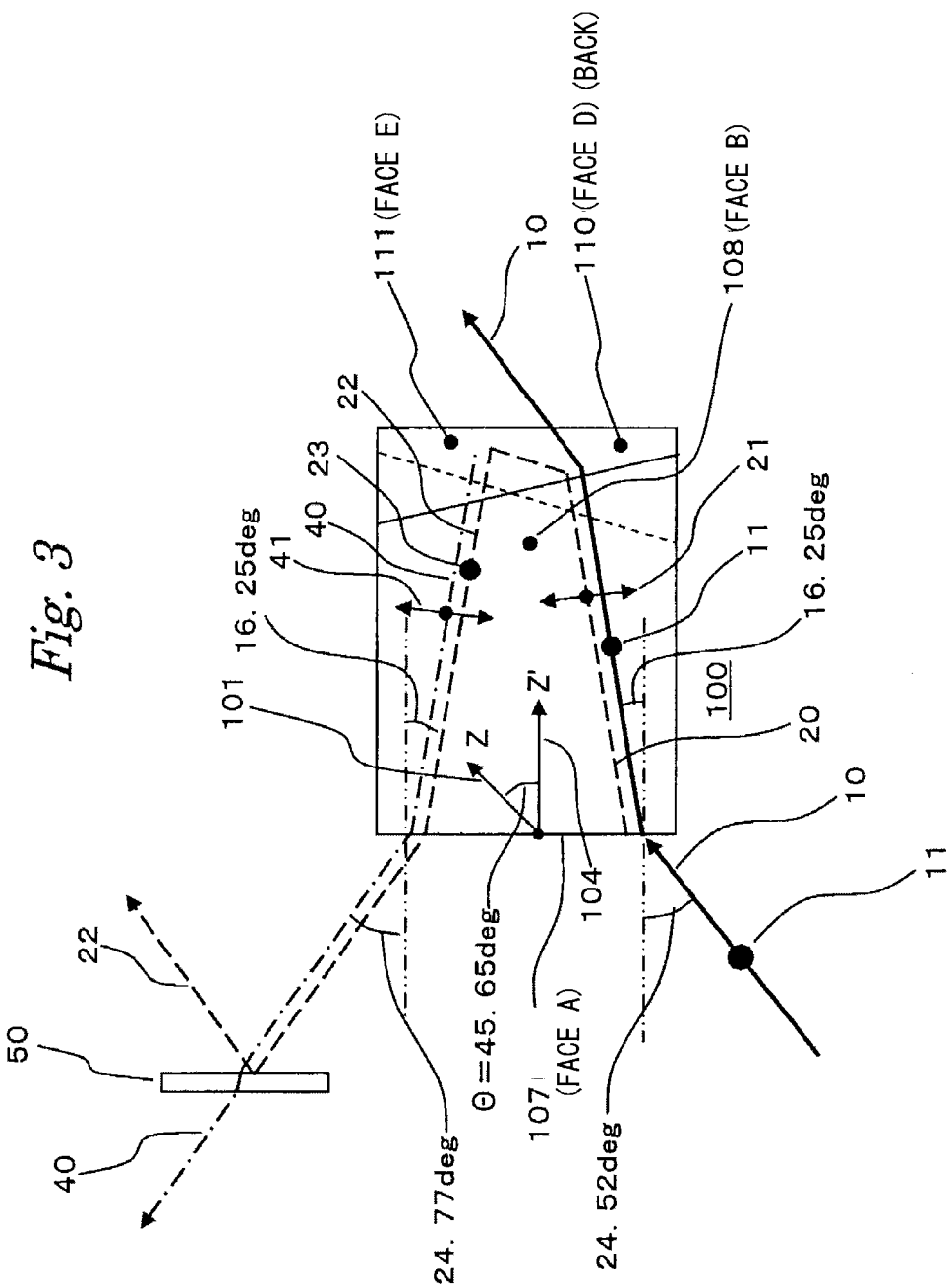
FIG. 3 is a schematic diagram illustrating the propagation direction and the polarization direction of light in the wavelength conversion crystal according to Embodiment 1 of the present invention, as viewed from a normal direction of a face B.

Now, a wavelength converting method by using the wavelength conversion crystal 100 according to Embodiment 1 will be described with reference to FIGS. 2 and 3. FIG. 2 is a perspective view schematically illustrating a propagation direction and a polarization direction of light in the wavelength conversion crystal 100. FIG. 3 is a schematic diagram illustrating the propagation direction and the polarization direction of light in the wavelength conversion crystal 100, as viewed from the normal direction of the face B 108. In FIGS. 2 and 3, the same numerals as those in FIG. 1 denote the same parts as or equivalent to those in FIG. 1.

In FIGS. 2 and 3, a solid line 10 denotes the fundamental wave light of the wavelength 1064 nm, which is, although not shown in the figures, emitted from a YAG laser which uses a neodymium (Nd)-doped yttrium aluminum garnet (YAG) crystal as the laser medium. A double arrow 11 denotes the polarization direction of the fundamental wave light 10.

A dotted line 20 denotes incoming second harmonic light of the wavelength 532 nm emitted by the first wavelength conversion in the wavelength conversion crystal 100, and a double arrow 21 denotes the polarization direction of the incoming second harmonic light 20. A dotted line 22 denotes outgoing second harmonic light with the direction of travel folded by reflection from the face D 110 and the face E 111, and a double arrow 23 denotes the polarization direction of the outgoing second harmonic light. A chain line 40 denotes fourth harmonic light of the wavelength 266 nm generated by the second wavelength conversion, and a double arrow 41 denotes the polarization direction of the fourth harmonic light 40.

Although not shown in the figures, the CLBO crystal, which can act as the wavelength conversion crystal 100 according to Embodiment 1, has a temperature around 150° C. maintained by a heater and a temperature adjustment mechanism, and is also provided with an adjustment mechanism which can adjust the installation angle of the crystal.

Next, the first wavelength conversion using the wavelength conversion crystal 100 according to Embodiment 1 will be described in detail. First, while the fundamental wave light 10 is aligned in a face which is parallel to the face B 108 (face C 109), the polarization direction 11 thereof is set perpendicular to the face B 108 (face C 109), so that the fundamental wave light 10 enters the wavelength conversion crystal 100 from the face A 107. On this occasion, as illustrated in FIG. 3, the incidence angle of the fundamental wave light 10 onto the face A 107, i.e., the angle formed with respect to the Z'-axis 104 which is the normal direction of the face A 107, is set to 24.52 deg. Since the orientation of the face A is set as described above, the CLBO crystal 100 exhibits a refractive index of 1.483 for the linear polarization component 11, perpendicular to the face B 108 (face C 109), of the wavelength 1064 nm which is incident on the face A of the wavelength conversion crystal 100 at the incidence angle 24.52 degrees. As a result of this refractivity effect, the direction of travel of the fundamental wave light 10 is deflected in the wavelength conversion crystal 100 according to the Snell's law, so that the direction of travel forms an angle 16.25 deg with respect to the Z'-axis, as illustrated in FIG. 3.

Since the fundamental wave light 10 in the wavelength conversion crystal 100 propagates in the face parallel to the face B 108 (face C 109), the propagation orientation of the fundamental wave light 10 in the wavelength conversion crystal 100 is $(\Theta, \phi)=(29.4$ deg, 45.0 deg) in terms of the polar coordinates of $\Theta, \phi$ based on the dielectric principal axes of the CLBO crystal 100, which coincides with the type-I phase-matching orientation for the first wavelength conversion which generates the second harmonic from the fundamental wave of the wavelength 1064 nm at the crystal temperature of 150° C. Further, since the polarization direction perpendicular to the face B 108 (face C) coincides with the polarization direction of an ordinary ray in the type-I phase-matching, the fundamental wave light 10 entering the wavelength conversion crystal 100 as described above is efficiently converted into the second harmonic light 20 of the wavelength 532 nm by the first wavelength conversion. On this occasion, since the second harmonic light 20 becomes an extraordinary ray, the polarization direction of incoming second harmonic light 20 is parallel to the face B 108 (face C 109).

Next, the second wavelength conversion using the wavelength conversion crystal 100 according to Embodiment 1 will be described in detail. The fundamental wave light 10 which has propagated through the wavelength conversion crystal 100 while being converted into the second harmonic light 20 reaches the face D 110. As described above, since the dual wavelength coating having a higher transmittance for the wavelength 1064 nm and a higher reflectance for the wavelength 532 nm is applied to the face D 110 and the face E 111, the fundamental wave light 10 which has reached the face D 110 is emitted outside the wavelength conversion crystal 100.

On the other hand, the incoming second harmonic light 20 of the wavelength 532 nm is reflected from the two faces of the face D 110 and the face E 111 to be the outgoing second harmonic light 22 with the direction of travel folded. Here, since the face D 110 and the face E 111 are formed in the orientations as described above, the propagation orientation of the outgoing second harmonic light 22 which has been reflected from the two faces of the face D 110 and the face E 111 forms an angle of 16.25 degrees with respect to the Z'-axis 104 in the face parallel to the face B 108 (face C 109) as in the incoming path. Therefore, the propagation orientation of the outgoing second harmonic light 22 in the wavelength conversion crystal 100 is parallel to $(\Theta, \phi)=(61.9$ deg, 45.0 deg) in the polar coordinates of $\Theta, \phi$ based on the dielectric principal axes of the CLBO crystal 100. However, the propagation orientation of the second harmonic light 20 is defined not as the orientation of the walk-off caused by the birefringence of the wavelength conversion crystal 100 but as the wavefront normal direction when it is assumed as a plane wave (the same applies hereinafter). Therefore, the propagation orientation of the outgoing second harmonic light 22 coincides with the type-I phase-matching orientation for the second wavelength conversion which generates the second harmonic from the fundamental wave of the wavelength 532 nm at the crystal temperature of 150° C.

Further, since the face D 110 and the face E 111 are formed in the orientations as described above, the polarization direction 21 of the incoming second harmonic light 20 is parallel to the face B 108 (face C 109), whereas most of the polarized light components of the outgoing second harmonic light 22 are perpendicular to the face B 108 (face C 109) as denoted by the numeral 23 in FIG. 2. Since the polarization direction perpendicular to the face B 108 (face C 109) coincides with the polarization direction of the ordinary ray in the type-I phase-matching, the outgoing second harmonic light 22, which has been reflected from the face D 110 and the face E 111 with the direction of travel folded, is efficiently converted into the fourth harmonic light 40 of the wavelength 266 nm by the second wavelength conversion. On this occasion, since the fourth harmonic light 40 becomes an extraordinary ray, the polarization direction 41 of the fourth harmonic light 40 is parallel to the face B 108 (face C 109).

Since the CLBO crystal 100 exhibits a refractive index of 1.497 for both of the outgoing second harmonic light 22 of the wavelength 532 nm which is the ordinary ray in the above described propagation orientation and the fourth harmonic light 40 of the wavelength 266 nm which is the extraordinary ray, both of the outgoing second harmonic light 22 and the fourth harmonic light 40 are emitted outside the wavelength conversion crystal 100 at an angle of 24.77 degrees with respect to the Z'-axis 104, when reaching the face A 107. From the second harmonic light 22 and the fourth harmonic light 40 both of which are emitted outside the wavelength conversion crystal 100 and propagate in the same direction, only the fourth harmonic light 40 of the wavelength 266 nm can be easily extracted by using a dual wavelength mirror 50 having a higher reflectance for the wavelength 532 nm and a higher transmittance for the wavelength 266 nm.

In Embodiment 1, the orientations of the respective faces of the wavelength conversion crystal 100 are determined as described above, so that the incident direction of the fundamental wave light 10 which is the light to be wavelength-converted is determined. As a result, since the fundamental wave light 10 enters the wavelength conversion crystal 100 in the orientation and the polarization direction corresponding to the phase-matching conditions for the first wave conversion which generates the type-I second harmonic from the fundamental wave of the wavelength 1064 nm and is efficiently converted into the second harmonic light 20 of the wavelength 532 nm, while the second harmonic light 20 is reflected from the two faces of the face D 110 and the face E 111 with the optical path folded so as to match the propagation orientation and the polarization direction 23 of the outgoing second harmonic light 22 with the orientation and the polarization direction corresponding to the phase-matching conditions for the second wavelength conversion which generates the type-I second harmonic from the fundamental wave of the wavelength 532 nm. Consequently, significant effect that the fourth harmonic light 40 of the wavelength 266 nm can be efficiently generated from the incident fundamental wave light 10 of the wavelength 1064 nm by using the single wavelength conversion crystal 100 can be achieved.

Incidentally, although Embodiment 1 exemplifies a configuration of using the type-I second harmonic generation from the fundamental wave of the wavelength 1064 nm as the first wave conversion and using the type-I second harmonic generation from the fundamental wave of the wavelength 532 nm as the second wave conversion to convert the fundamental wave light of the wavelength 1064 nm into the fourth harmonic light of the wavelength 266 nm by using a single wavelength conversion crystal, the wavelength of the fundamental wave which is the light to be wavelength-converted is not limited to them. The point is, it is needless to say, that the same effect can be obtained by determining the orientations of the respective faces of the wavelength conversion crystal based on the phase-matching orientations and the polarization directions of the first wavelength conversion which generates the second harmonic light and the second wavelength conversion which generates harmonic light of higher-order than the second harmonic light, as far as both of the second harmonic light and harmonic light of higher-order than the second harmonic light can be generated from the same wavelength conversion crystal at the same temperature. Meanwhile, the refractive index of the wavelength conversion crystal for arbitrary wavelength, orientation and polarization direction can be derived by using the Sellmeier's equation which is determined by the physical property of the wavelength conversion crystal. Further, as long as the phase-matching orientations and the polarization directions of the first wavelength conversion which generates the second harmonic light and the second wavelength conversion which generates harmonic light of higher-order than the second harmonic light are known, the orientation of the reflective face to be formed on the wavelength conversion crystal can be analytically determined according to a geometrical-optical approach.

It should be noted here that the light is also affected by the birefringence in the propagation process from the first reflective face D 110 to the second reflective face E 111 unless the propagation orientation coincides with the optic axis of the wavelength conversion crystal 100. That is, the polarization direction is only allowed in the two directions of the ordinary ray and the extraordinary ray in the propagation process from the first reflective face D 110 to the second reflective face E 111. Therefore, the effect of the birefringence in the propagation process from the first reflective face D 110 to the second reflective face E 111 also needs to be considered in designing the orientation of the reflective face.

For example, as shown in Embodiment 1, when the phase-matching of the second wavelength conversion is of type-I, the light to be wavelength-converted which satisfies the phase-matching conditions (second harmonic light of the wavelength 532 nm in Embodiment 1) has only one polarization direction (ordinary ray in Embodiment 1). When the light is divided into two polarized light components of the ordinary ray and the extraordinary ray and propagates in the propagation process from the first reflective face D 110 to the second reflective face E 111, the resulting two polarized light components of the ordinary ray and the extraordinary ray are hard to be combined into a single polarized light component by the reflection effect of the second reflective face E 111 for matching the propagation orientation of the light with the phase-matching orientation of the second wavelength conversion. Therefore, it is preferable that the polarized component determined by the reflection effect of the first reflective face D 110 is polarized as much as to either the ordinary ray or the extraordinary ray in the propagation process from the first reflective face D 110 to the second reflective face E 111.

In Embodiment 1, since the orientation of the first reflective face D 110 is formed as described above, it is theoretically possible to polarize 99% or more of the polarized component of the second harmonic light which is to be reflected from the first reflective face D 110 in the ordinary ray direction in the propagation process from the first reflective face D 110 to the second reflective face E 111. Further, since the second reflective face E 111 is formed as described above, it is theoretically possible to polarize 99% or more of the ordinary ray component reflected from the second reflective face E 111 into the ordinary ray direction which corresponds to the phase-matching condition for the second wavelength conversion in the phase-matching orientation of the second wavelength conversion, so that the second wavelength conversion can be efficiently performed. Incidentally, it should be noted that the values are rounded to one decimal place for the polar coordinates of $\Theta$, $\phi$ in the normal direction of the above described first reflective face D 110 and the second reflective face E 111 (the same applies hereinafter).

In Embodiment 1, although a configuration of having two reflective faces (faces D 110 and E 111) formed on the wavelength conversion crystal 100 to correspond to the phase-matching conditions for the second wavelength conversion has been described, the number of the reflective faces to correspond to the phase-matching conditions for the second wavelength conversion is not limited to that. The main point is only need to determine the orientations of the respective reflective faces by taking account of birefringence effect so that the orientations produce the maximum number of the polarized components which correspond to the phase-matching conditions for the second wavelength conversion also in the process of matching the propagation orientation of the light to be wavelength-converted with the phase-matching orientation of the second wavelength conversion. Once the propagation orientations in the wavelength conversion crystal 100 are determined, a polarization direction can be uniquely determined for each of the ordinary ray and the extraordinary ray based on the relative orientation of each of the rays with respect to the dielectric principal axes.

Further, although Embodiment 1 exemplifies a configuration of using the CLBO crystal for the wavelength conversion crystal 100, using the type-I second harmonic generation from the fundamental wave of the wavelength 1064 nm as the first wave conversion, and using the type-I second harmonic generation from the fundamental wave of the wavelength 532 nm as the second wave conversion to convert the fundamental wave light of the wavelength 1064 nm into the fourth harmonic light of the wavelength 266 nm by using a single wavelength conversion crystal, the kind of the wavelength conversion crystal and the phase-matching type in the wavelength conversion are not limited to them. The point is that the same effect as that of Embodiment 1 can be obtained only by determining the orientations of the respective faces of the wavelength conversion crystal based on the geometrical-optical approach according to the phase-matching orientations and the polarization directions for generating the second harmonic light and harmonic light of higher-order than the second harmonic light, as far as the wavelength conversion crystal is such that the second harmonic light and harmonic light of higher-order than the second harmonic light can be generated from the same wavelength conversion crystal at the same temperature.

Meanwhile, the orientation of each face formed on the actual wavelength conversion crystal may be deviated from a designed value due to manufacturing error. In this case, it only needs to optionally adjust the installation angle and the temperature of the wavelength conversion crystal so as to produce the maximum output of the harmonic light of higher-order than the second harmonic.

(Embodiment 2)

Figure 4:
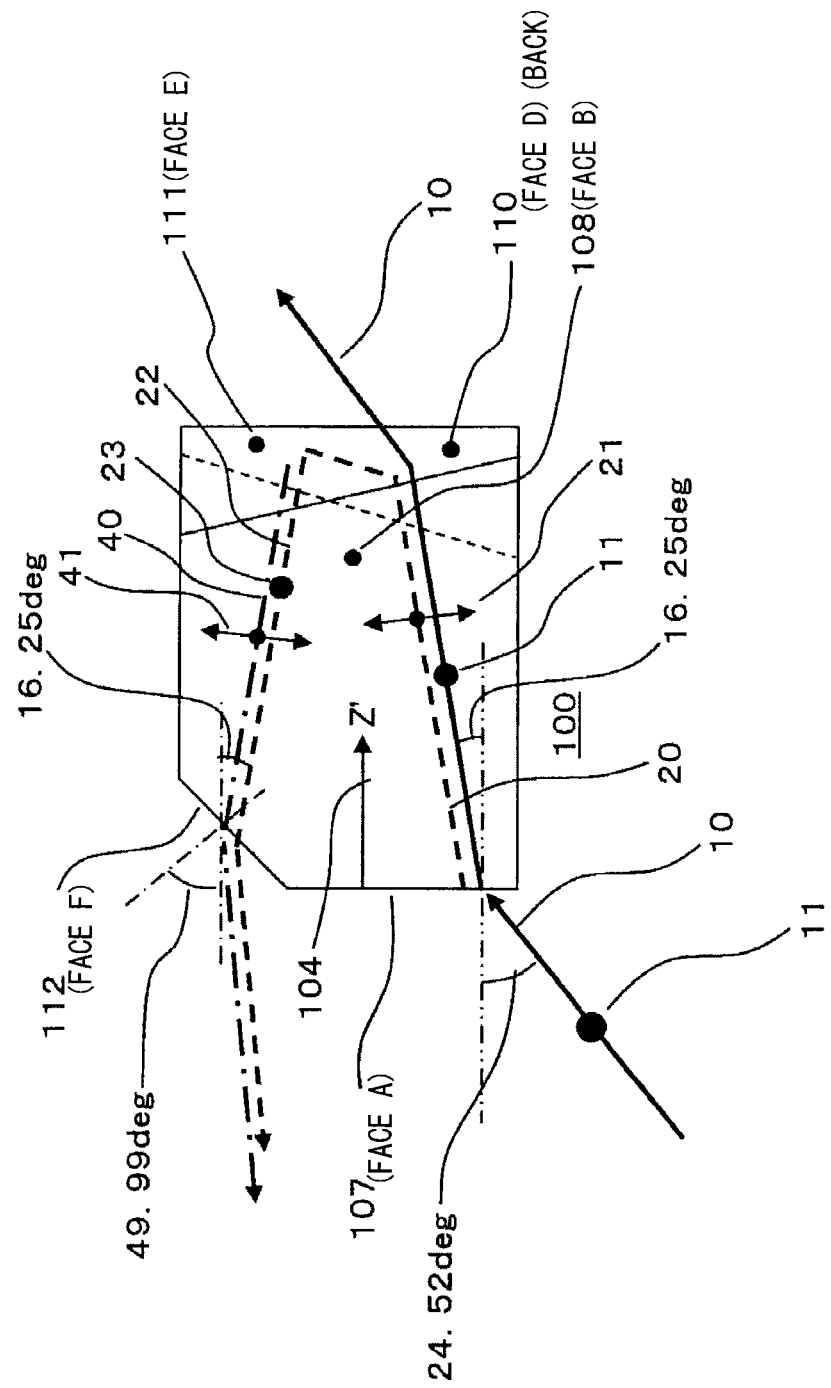
FIG. 4 is a schematic diagram illustrating a propagation direction and a polarization direction of light in a wavelength conversion crystal according to Embodiment 2 of the present invention, as viewed from a normal direction of a face B.

FIG. 4 is a schematic diagram illustrating a propagation direction and a polarization direction of light in a wavelength conversion crystal 100 according to Embodiment 2 of the present invention, as viewed from a normal direction of a face B 108. In FIG. 4, the same numerals as those in FIGS. 1 to 3 denote the same parts as or equivalent to those in FIGS. 1 to 3. Embodiment 2 also exemplifies a configuration, as described in Embodiment 1, of using the CLBO crystal heated to about 150° C. for the wavelength conversion crystal 100, using the type-I second harmonic generation from the fundamental wave of the wavelength 1064 nm as the first wave conversion, and using the type-I second harmonic generation from the fundamental wave of the wavelength 532 nm as the second wave conversion to convert the fundamental wave light of the wavelength 1064 nm into the fourth harmonic light of the wavelength 266 nm by using the single wavelength conversion crystal 100. That is, the orientations of a face A 107, a face B 108, a face D 109, and a face E 110 of the wavelength conversion crystal 100 with respect to the dielectric principal axes, and the propagation orientations and the polarization directions of the fundamental wave light 10 and the second harmonic lights 20 and 22 and the fourth harmonic light 40 in the wavelength conversion crystal 100 in Embodiment 2 are the same as those of Embodiment 1.

The wavelength conversion crystal 100 of Embodiment 2 has a face F 112 formed so that the fourth harmonic light 40 generated in the wavelength conversion crystal 100 is emitted through the face F 112 outside the wavelength conversion crystal 100. Here, the face F 112 is oriented at the angle of 49.99 with respect to the Z'-axis 104, and the orientation of the normal of the face F 112 is $(\Theta, \phi)=(84.36 \text{ deg}, 45.0 \text{ deg})$ in the polar coordinates of $\Theta, \phi$ based on the dielectric principal axes. The polarization 41 of the fourth harmonic light 40 is parallel to the face B 108 and the fourth harmonic light 40 is incident on the face F 112 as P-polarization. Since the propagation orientation of the fourth harmonic light 40 in the wavelength conversion crystal 100 is parallel to the face B 108 at an angle of 16.25 degrees with respect to the Z'-axis 104, the incidence angle of the fourth harmonic light 40 onto the face F is 33.74 degrees. Since the wavelength conversion crystal 100 exhibits a refractive index of 1.497 for the fourth harmonic light 40 of the above described propagation orientation and polarization direction in the wavelength conversion crystal 100, the incidence angle of 33.74 degrees of the fourth harmonic light 40 with respect to the face F 112 is a Brewster angle.

In Embodiment 2, the orientation of the face F 112 through which the fourth harmonic light 40 is emitted the wavelength conversion crystal 100 is formed such that the fourth harmonic light 40 is incident as P-polarization at an incidence angle corresponding to the Brewster angle. Therefore, under an ideal condition that the face F 112 is free from deterioration and foreign matter attachment, virtually 100% of the fourth harmonic light 40 can be extracted from the wavelength conversion crystal 100 to outside without any loss.

Incidentally, although Embodiment 2 exemplifies a configuration of using the CLBO crystal for the wavelength conversion crystal 100 to generate the fourth harmonic light 40 of the wavelength 266 nm from the fundamental wave of the wavelength 1064 nm, the wavelength of the fundamental wave light, the kind of the wavelength conversion crystal, and the order of the high-order harmonic to be emit are not limited to them. The point is that the same effect as that of Embodiment 2 can be obtained by forming the angle of the exit surface to be the Brewster angle according to the propagation orientation and the polarization direction of the high-order harmonic light to be extracted from the wavelength conversion crystal, and the refractive index sensed by the high-order harmonic light.

(Embodiment 3)

Figure 5:
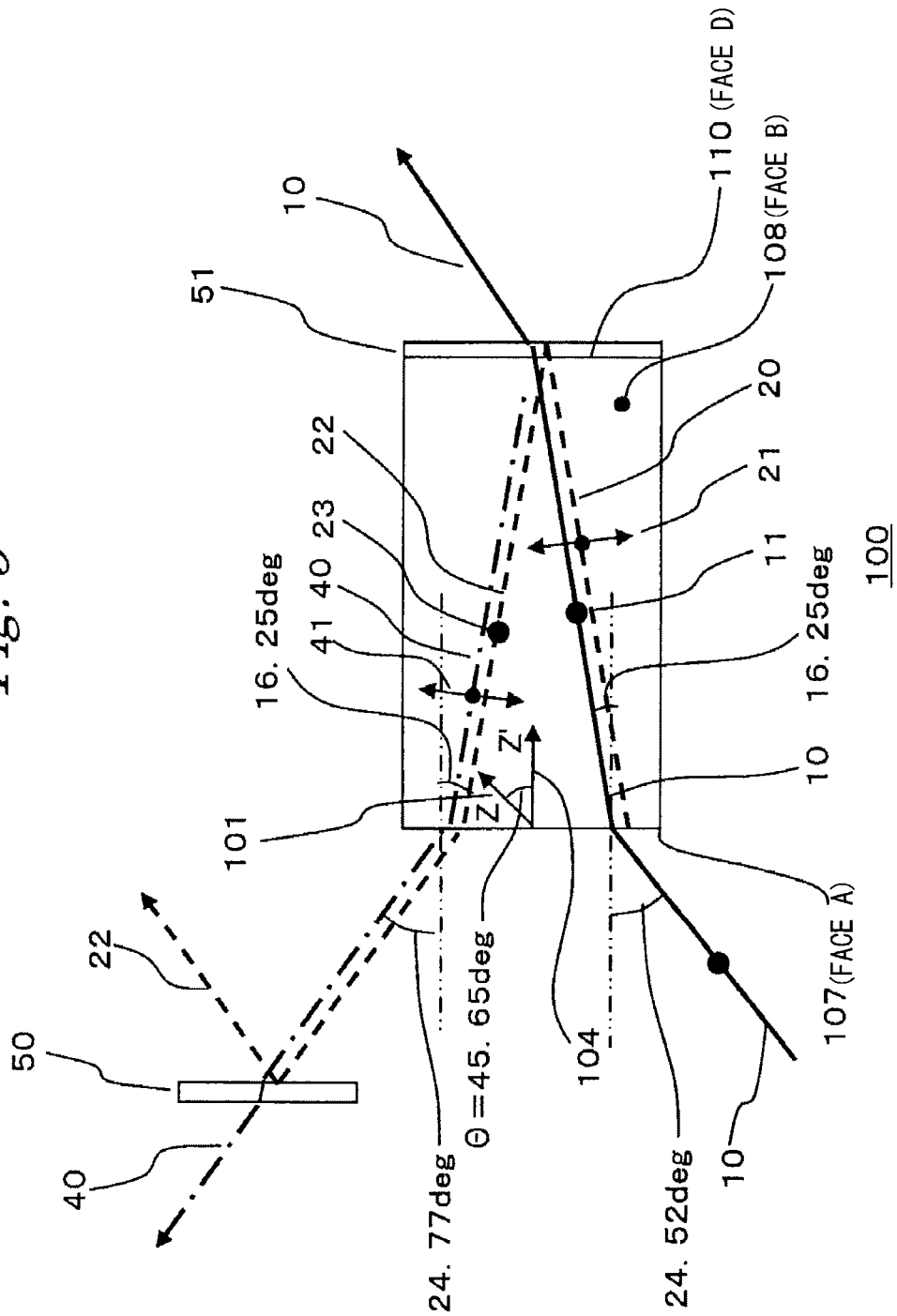
FIG. 5 is a schematic diagram illustrating a propagation direction and a polarization direction of light in a wavelength conversion crystal according to Embodiment 3 of the present invention, as viewed from a normal direction of a face B.

FIG. 5 is a schematic diagram illustrating a propagation direction and a polarization direction of light in a wavelength conversion crystal 100 according to Embodiment 3 of the present invention, as viewed from a normal direction of a face B 108. In FIG. 5, the same numerals as those in FIGS. 1 to 4 denote the same parts as or equivalent to those in FIGS. 1 to 4. Embodiment 3 also exemplifies a configuration, as described in Embodiments 1 and 2, of using a CLBO crystal heated to about 150° C. for the wavelength conversion crystal 100, using the type-I second harmonic generation from the fundamental wave of the wavelength 1064 nm as the first wave conversion and using the type-I second harmonic generation from the fundamental wave of the wavelength 532 nm as the second wave conversion to convert the fundamental wave light of the wavelength 1064 nm into the fourth harmonic light of the wavelength 266 nm by using the single wavelength conversion crystal 100. The orientations of a face A 107 and a face B 108 of the wavelength conversion crystal 100 with respect to the dielectric principal axes are the same as those of Embodiments 1 and 2.

A face D 110 of the wavelength conversion crystal 100 of Embodiment 3 is formed parallel to the face A 107 and is joined with a reflection type of half-wave plate 51 for the second harmonic lights 20 and 22 of the wavelength 532 nm using optical contact. The optic axis of the half-wave plate 51 joined to the face D is orientated at an angle of 45 degrees with respect to the normal of the face B 108.

In this embodiment since the face D 110 is formed parallel to the face A 107, the propagation orientation of the outgoing second harmonic light 22 in the wavelength conversion crystal 100 reflected from the half-wave plate 51 which is joined to the face D 110 is the same as that of Embodiments 1 and 2. Here, the half-wave plate 51 is joined to the face D 110 so that its optic axis forms an angle of 45 degrees with respect to the normal of the face B 108. Therefore, the polarization direction 21 of the incoming second harmonic light 20 in parallel to the face B 108 is rotated by 90 degrees by the half-wave plate 51, so that the polarization direction 23 of the outgoing second harmonic light 22 becomes equal to the normal direction of the face B 108. As a result, the propagation orientation and the polarization direction 23 of the outgoing second harmonic light 22 coincides with the type-I phase-matching conditions for the second wavelength conversion which generates the second harmonic from the fundamental wave of the wavelength 532 nm at the crystal temperature of 150° C., so that the fourth harmonic light 40 of the wavelength 266 nm can be efficiently generated.

As shown in Embodiment 3, when a reflection type of polarization rotating element, which rotates the polarization direction of the second harmonic light generated by the first wavelength conversion to the polarization direction corresponding to the phase-matching condition for the second wavelength conversion, is joined to a face which is formed in an orientation for reflecting the second harmonic light generated by the first wavelength conversion into the phase-matching orientation of the second wavelength conversion in a single wavelength conversion crystal, only a single reflective face is enough to be formed in the wavelength conversion crystal to match the orientation and the polarization direction of the second harmonic light generated by the first wavelength conversion with the phase-matching conditions for the second wavelength conversion. Therefore, the first and second wavelength conversion can be realized in a simple and low-cost configuration by using a single wavelength conversion crystal.

Incidentally, although Embodiment 3 exemplifies a configuration of using the CLBO crystal for the wavelength conversion crystal 100 to generate the fourth harmonic light 40 of the wavelength 266 nm from the fundamental wave of the wavelength 1064 nm, the wavelength of the fundamental wave light, the kind of the wavelength conversion crystal, and the order of the high-order harmonic to be emit are not limited to them. Meanwhile, the polarization direction may be practically deviated from a designed value due to manufacturing error in the wavelength conversion crystal manufacturing process. In this case, it only needs to optionally adjust the angle of the reflection type of polarization rotating element to be joined so as to produce the maximum output of the targeted high-order harmonic light.

(Embodiment 4)

Figure 6:
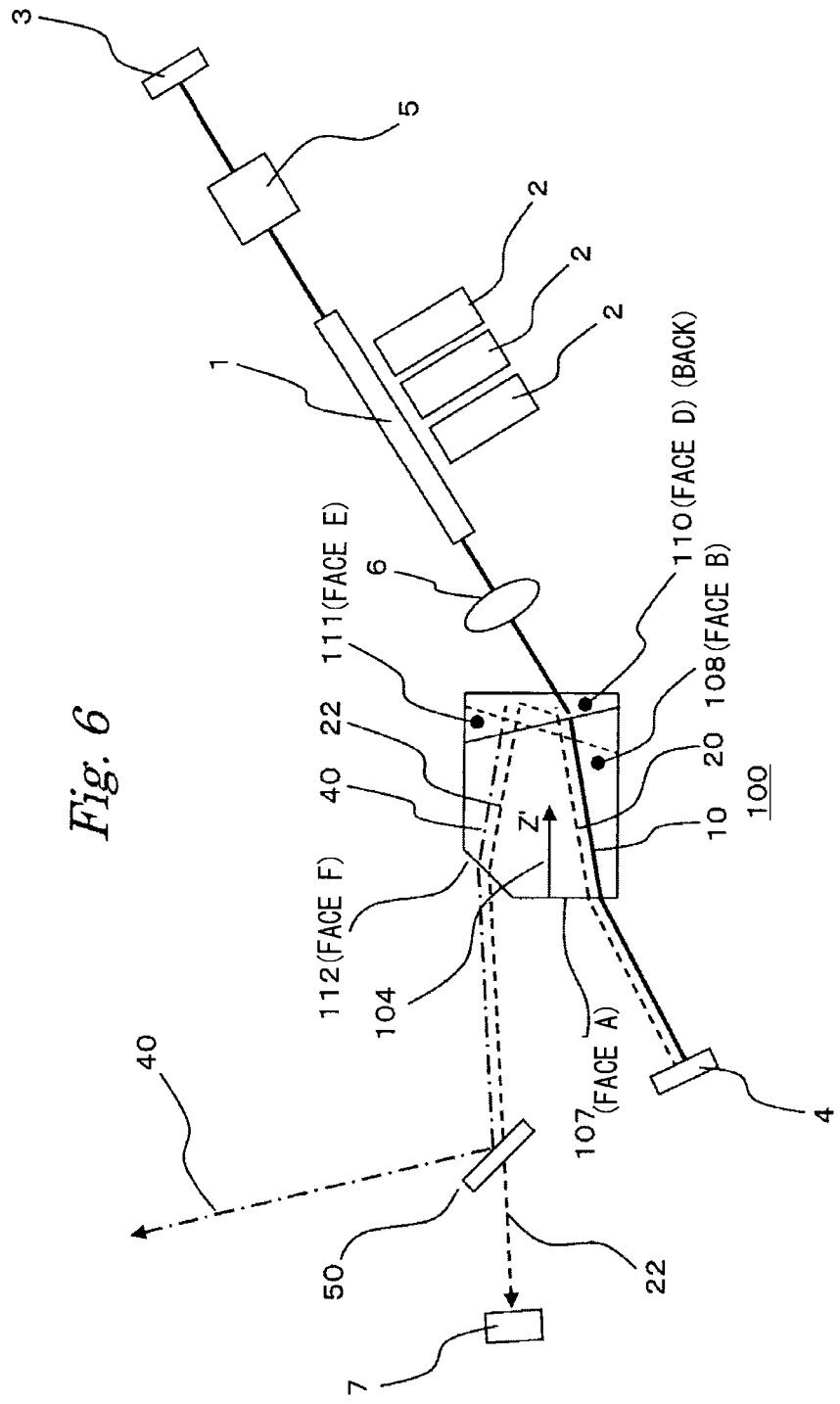
FIG. 6 is a schematic diagram illustrating a configuration of a wavelength conversion laser device according to Embodiment 4 of the present invention.

FIG. 6 is a schematic diagram illustrating a configuration of a wavelength conversion laser device according to Embodiment 4 of the present invention. The wavelength conversion laser device described in this embodiment uses such a wavelength conversion crystal 100 which has the same orientations of the respective faces formed as those in Embodiment 2 illustrated in FIG. 4. Although not shown in the figure, the CLBO crystal, which can act as the wavelength conversion crystal 100 according to Embodiment 1, has a temperature around 150° C. maintained by a heater and a temperature adjustment mechanism and is also provided with an adjustment mechanism which can adjust the installation angle of the crystal. Further, a dual wavelength coating having a higher transmittance for both of the wavelength 1064 nm and the wavelength 532 nm is applied to the face A 107 of the wavelength conversion crystal 100 of this embodiment. Also, a dual wavelength coating having a higher transmittance for the wavelength 1064 nm and a higher reflectance for the wavelength 532 nm is applied to the face D 110 and the face E 111.

In FIG. 6, a Nd-doped YAG crystal is used for a solid-state laser medium 1. Three semiconductor lasers 2 are installed alongside the solid-state laser medium 1 so as to be used as excitation light sources for the solid-state laser medium 1. A coating having a higher reflectance for the wavelength 1064 nm is applied to a first reflecting mirror 3 constituting an optical resonator. Another coating having a higher reflectance for both of the wavelength 1064 nm and the wavelength 532 nm is applied to a second reflecting mirror 4 constituting the optical resonator. An acousto-optical Q-switching element 5 is interposed in the optical resonator. A polarization selective element 6 for the wavelength 1064 nm is provided, e.g., in this embodiment a plane parallel plate of quartz is interposed at a Brewster angle for the wavelength 1064 nm. Although not shown in the figure, the polarization selective element 6 is provided with an adjustment mechanism which can adjust the angle about the optical axis of the fundamental wave light 10 as the rotation axis. Further, a dual wavelength coating having a higher transmittance for the second harmonic light 22 of the wavelength 532 nm and a higher reflectance for the fourth harmonic light 40 of the wavelength 266 nm is applied to a dual wavelength mirror 50 of this embodiment. Meanwhile, the second harmonic light 22 transmitted through the dual wavelength mirror 50 enters a damper 7.

Next, operation of Embodiment 4 will be described below. The optical axis of the optical resonator in the wavelength conversion laser device of this embodiment which includes the first reflecting mirror 3 and the second reflecting mirror 4 is adjusted so that the optical path in the wavelength conversion crystal 100 corresponds to the type-I phase-matching orientation for the first wavelength conversion which generates the second harmonic light from the fundamental wave of the wavelength 1064 nm. Also, the polarization direction of the fundamental wave light 10 in the optical resonator is adjusted by the polarization selective element 6 so that the polarization direction in the wavelength conversion crystal 100 corresponds to the type-I phase-matching condition for the second harmonic light emission from the fundamental wave of the wavelength 1064 nm as described in Embodiment 1.

When irradiating the solid-state laser medium 1 with excitation light emitted from the semiconductor laser 2 to excite the solid-state laser medium 1, the solid-state laser medium 1 shows amplification in a specific wavelength range. Light of spontaneous emission produced from the solid-state laser medium 1 travels back and forth between the first reflecting mirror 3 and the second reflecting mirror 4 in the optical resonator, and is amplified as it passes through the excited solid-state laser medium 1 to achieve the laser oscillation. Here, a higher reflectance coating for the wavelength 1064 nm is applied to both of the first reflecting mirror 3 and the second reflecting mirror 4. Therefore, the wavelength 1064 nm is selected for the oscillation wavelength in the wavelength conversion laser device of this embodiment. The wavelength conversion laser device of this embodiment has the acousto-optical Q-switching element 5 interposed in the optical resonator and uses the Q-switching element 5 to increase or decrease a loss of the optical resonator in a certain cycle, resulting in a Q-switching pulse of high peak output.

Since the orientation and the polarization direction of the fundamental wave light 10 which passes through the wavelength conversion crystal 100 correspond to the phase-matching conditions for the first wavelength conversion, the fundamental wave light 10 can be efficiently converted into the second harmonic light 20. The wavelength conversion laser device of this embodiment has the wavelength conversion crystal 100 installed inside the optical resonator which generates the fundamental wave light 10, therefore, both of the incoming fundamental wave traveling from the first reflecting mirror 3 to the second reflecting mirror 4 and the outgoing fundamental wave traveling from the second reflecting mirror 4 to the first reflecting mirror 4 are converted into the second harmonic light 20. The second harmonic light 20 generated from the incoming fundamental wave traveling from the first reflecting mirror 3 to the second reflecting mirror 4 once exits from the face A 107 of the wavelength conversion crystal 100 and reaches the second reflecting mirror 4. Since the higher reflectance coating for both of the wavelength 1064 nm and the wavelength 532 nm is applied to the second reflecting mirror 4, the second harmonic light 20 generated from the incoming fundamental wave light 10 traveling from the first reflecting mirror 3 to the second reflecting mirror 4 is reflected by the second reflecting mirror 4 and enters the wavelength conversion crystal 100 again. The second harmonic light 20 which has entered twice the wavelength conversion crystal 100 is reflected from the face D 110 and the face E 111 and, accordingly, both of the orientation and the polarization direction thereof correspond to the phase-matching conditions for the second wavelength conversion. Then, the second harmonic light 20 can be efficiently converted into the fourth harmonic light 40 of the wavelength 266 nm.

As shown in Embodiment 4, the wavelength conversion crystal is installed inside the optical resonator of the wavelength conversion laser device which generates the fundamental wave light and the optical axis orientation and the polarization direction of the fundamental wave light in the optical resonator are made to correspond to the phase-matching conditions for the first wavelength conversion in the configuration of using a single wavelength conversion crystal for performing the first and second wavelength conversion, the fundamental wave light on both of the incoming path and the outgoing path in travelling back and forth in the optical resonator can be subject to the first wavelength conversion, thereby improving the conversion efficiency of the first wavelength conversion. In addition, both of the harmonic light generated from the incoming fundamental wave light by the first wavelength conversion and the harmonic light generated from the outgoing fundamental wave light by the first wavelength conversion can be subject to the second wavelength conversion, thereby improving the conversion efficiency of the second wavelength conversion as well.

Since the wavelength conversion crystal is installed inside the optical resonator of the wavelength conversion laser device which generates the fundamental wave light in Embodiment 4, the intensity of the fundamental wave light entering the wavelength conversion crystal can be easily enhanced, hence, the conversion efficiency of the first wavelength conversion can be effectively improved. Consequently, the conversion efficiency of the second wavelength conversion can be improved.

Since the wavelength conversion laser device of Embodiment 4 has a configuration of using a single wavelength conversion crystal to perform the first and second wavelength conversion, any adjustment work for performing the second wavelength conversion can be omitted, and therefore, it can stably generate the second wavelength-converted light.

Incidentally, although Embodiment 4 exemplifies a configuration of performing only the first wave conversion in the optical resonator of the wavelength conversion laser device, as for, e.g., the third harmonic generation or the like which generates the second harmonic light by the first wavelength conversion and generates the sum frequency of the second harmonic light and the fundamental wave by the second wave conversion, there may be an alternative configuration of performing both of the first wavelength conversion and the second wavelength conversion inside the optical resonator of the wavelength conversion laser device.

(Embodiment 5)

Figure 7:
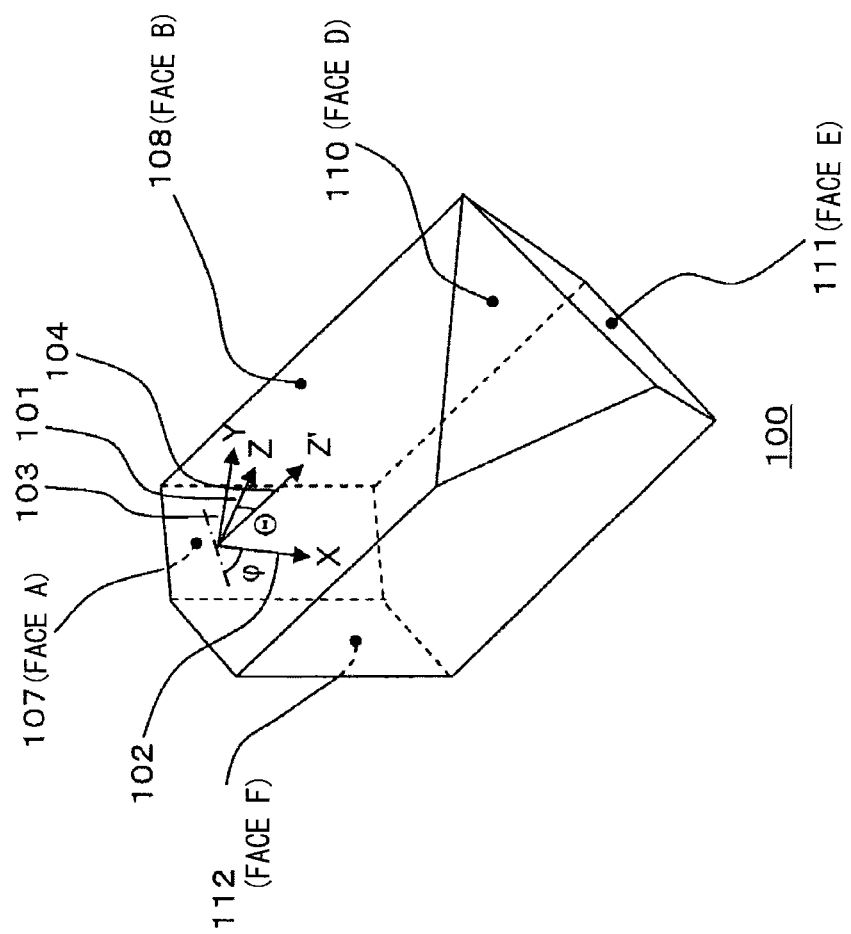
FIG. 7 is a perspective view illustrating a configuration of a wavelength conversion crystal according to Embodiment 5 of the present invention.

FIG. 7 is a perspective view illustrating a configuration of a wavelength conversion crystal 100 according to Embodiment 5 of the present invention. In FIG. 7, the same numerals as those in FIGS. 1 to 6 denote the same parts as or equivalent to those in FIGS. 1 to 6. Also in Embodiment 5, a CLBO crystal heated to about 150° C. is used for the wavelength conversion crystal 100, as described in Embodiments 1 to 4. Embodiment 5 exemplifies a configuration of performing the second harmonic generation as the first wave conversion from the fundamental wave of the wavelength 1064 nm by using the type-II phase-matching and performing the second harmonic generation as the second wave conversion from the fundamental wave of the wavelength 532 nm as in Embodiments 1 to 4 by using the type-I phase-matching to convert the fundamental wave light of the wavelength 1064 nm into the fourth harmonic light of the wavelength 266 nm by using the single wavelength conversion crystal 100. Since the type-II second harmonic emission from the fundamental wave of the wavelength of 1064 nm is used as the first wave conversion in this embodiment, the orientations of the respective faces formed on the wavelength conversion crystal 100 are different from those in Embodiments 1 to 4.

In FIG. 7, an arrow 104 represents a Z'-axis corresponding to a main propagation direction of the light in the wavelength conversion crystal 100. In this embodiment, the type-II phase-matching orientation for the first wavelength conversion which generates the second harmonic from the fundamental wave of the wavelength 1064 nm at the crystal temperature of 150° C. is $(\Theta, \phi)=(42.6$ deg, 0 deg) in the polar coordinates of $\Theta$, $\phi$ based on the dielectric principal axes. Further, the type-I phase-matching orientation for the second wavelength conversion which generates the second harmonic from the fundamental wave of the wavelength 532 nm at the crystal temperature of 150° C. is $(\Theta, \phi)=(61.9$ deg, 45.0 deg) in the polar coordinates of $\Theta$, $\phi$ based on the dielectric principal axes. Therefore, the orientation of the Z'-axis 104 is defined by the intermediate orientation between the phase-matching orientation for the first wavelength conversion and the phase-matching orientation for the second wavelength conversion as $(\Theta, \phi)=(50.08$ deg, 25.62 deg) in the coordinates of $\Theta$, $\phi$ based on dielectric principal axes.

Further, in the wavelength conversion crystal 100, the normal direction of the face A 107 coincides with the phase-matching orientation of the first wavelength conversion and the normal direction of the face F 112 coincides with the phase-matching orientation of the second wavelength conversion. The face B 108 is a plane parallel to both of the phase-matching orientation for the first wavelength conversion and the phase-matching orientation for the second wavelength conversion as in Embodiments 1 to 5. The face C 109 is formed parallel to the face B 108.

Next, the orientations of the respective faces formed on the wavelength conversion crystal 100 according to Embodiment 5 will be described in detail by using the Cartesian coordinate system XYZ and the polar coordinate system $\Theta\phi$ based on the dielectric principal axes of the wavelength conversion crystal 100. Here, the angle of deviation $\Theta$ is defined as an angle measured with respect to the Z-axis 101 which is one of the dielectric principal axes, and the angle of deviation $\phi$ is defined as an angle at which projection of an orientation to be described onto the XY-plane is measured with respect to the X-axis 102 which is one of the dielectric principal axes.

Since the normal direction of the face A 107 coincides with the type-II phase-matching orientation for the first wavelength conversion which generates the second harmonic from the fundamental wave of the wavelength 1064 nm at the crystal temperature of 150° C., it is described as $(X, Y, Z)=(0.6769, 0, 0.7361)$ in terms of the Cartesian coordinate system XYZ and $(\Theta, \phi)=(42.6$ deg, 0 deg) in terms of the polar coordinate system $\Theta\phi$.

Since the face B 108 and the face C 109 which is parallel thereto are also parallel to both of the phase-matching orientation of the first wavelength conversion and the phase-matching orientation of the second wavelength conversion, the normal direction of the face B 108 and the face C 109 is described as $(X, Y, Z)=(0.7181, -0.2195, -0.6604)$ in terms of the Cartesian coordinate system XYZ and $(\Theta, \phi)=(131.33$ deg, -16.99 deg) terms of in the polar coordinate system $\Theta\phi$.

The normal direction of the first reflective face D 110 is described as $(X, Y, Z)=(-0.2863, -0.0938, 0.9535)$ in terms of the Cartesian coordinate system XYZ and $(\Theta, \phi)=(17.53$ deg, -161.86 deg) in terms of the polar coordinate system $\Theta\phi$.

The normal direction of the second reflective face E 111 is described as $(X, Y, Z)=(0.9029, 0.4080, 0.1351)$ in terms of the Cartesian coordinate system XYZ and $(\Theta, \phi)=(82.24$ deg, 24.31 deg) in terms of the polar coordinate system $\Theta\phi$.

Here, an anti-reflection coating for the wavelength 1064 nm is applied to the face A 107 of the wavelength conversion crystal 100 according to Embodiment 5 and an anti-reflection coating for the wavelength 266 nm is applied to the face F 112. A dual wavelength coating having a higher transmittance for the wavelength 1064 nm and a higher reflectance for the wavelength 532 nm is applied to the face E 111.

Figure 8:
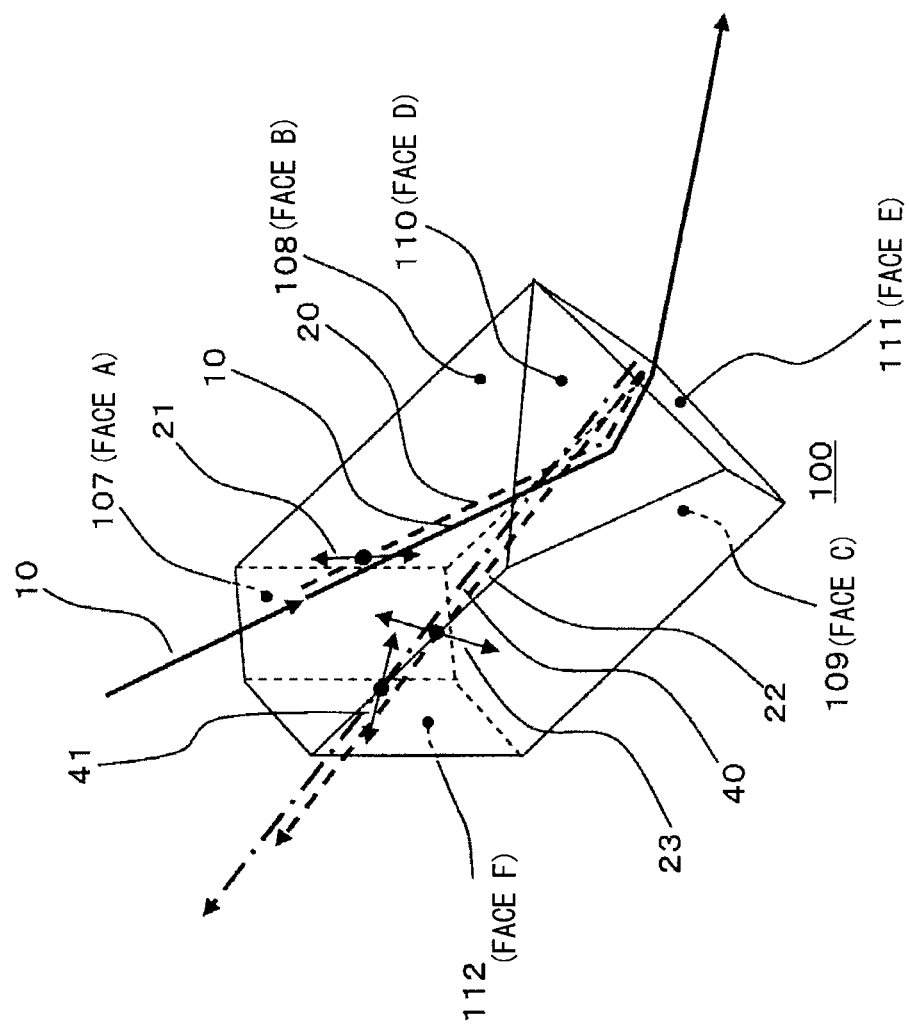
FIG. 8 is a perspective view schematically illustrating a propagation direction and a polarization direction of light in the wavelength conversion crystal according to Embodiment 5 of the present invention.
Figure 9:
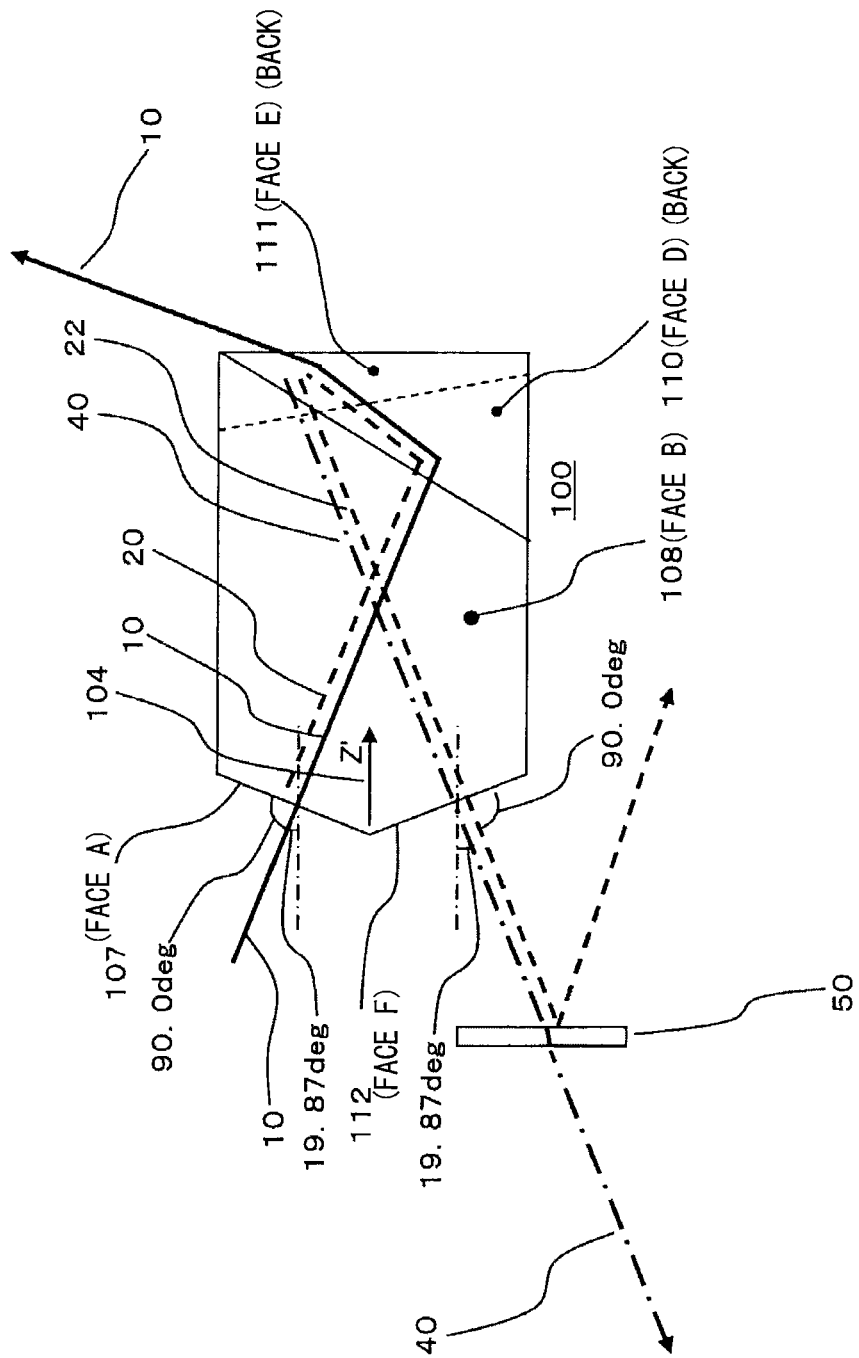
FIG. 9 is a schematic diagram illustrating the propagation direction and the polarization direction of light in the wavelength conversion crystal according to Embodiment 5 of the present invention, as viewed from a normal direction of a face B.

Next, a wavelength converting method by using the wavelength conversion crystal 100 according to Embodiment 5 will be described with reference to FIGS. 8 and 9. FIG. 8 is a perspective view schematically illustrating the propagation direction and the polarization direction of light in the wavelength conversion crystal 100 according to Embodiment 5. FIG. 9 is a schematic diagram illustrating the propagation direction and the polarization direction of light in the wavelength conversion crystal 100 according to Embodiment 5, as viewed from the normal direction of the face B 108. In FIGS. 8 and 9, the same numerals as those in FIGS. 1 to 7 denote the same parts as or equivalent to those in FIGS. 1 to 7.

In Embodiment 5, since the type-II phase-matching is used for the first wavelength conversion, a randomly polarized fundamental wave light 10 of the wavelength 1064 nm is directed to be perpendicularly incident on the face A 107. Since the face A 107 is formed so that the normal thereof coincides with the phase-matching orientation of the first wavelength conversion, the propagation orientation of the fundamental wave light 10 in the wavelength conversion crystal 100 can coincide with the phase-matching orientation of the first wavelength conversion when the fundamental wave light 10 is directed to be perpendicularly incident on the face A 107. Further, since the polarization direction is only allowed for the ordinary ray and extraordinary ray directions in the wavelength conversion crystal 100, the randomly polarized fundamental wave light 10 which has almost even distribution of polarization direction is divided almost equally into the ordinary ray and the extraordinary ray in the wavelength conversion crystal 100, so that the second harmonic light 20 of the wavelength 532 nm can be efficiently generated by the type-II phase-matching. Since the second harmonic light 20 generated by the type-II phase-matching is an extraordinary ray, its propagation orientation is the same as that of the fundamental wave light 10 and its polarization direction is described as $(\Theta, \phi) = (47.40 \text{ deg}, 180.0 \text{ deg})$ in terms of the polar coordinates of $\Theta, \phi$ based on the dielectric principal axes of the CLBO crystal.

The fundamental wave light 10 and the incoming second harmonic light 20 propagating in the wavelength conversion crystal 100 are incident on the face D 110 and then subject to total internal reflection due to a difference of refractive index between the inside and outside of the wavelength conversion crystal 100 with their propagation orientation changed and then incident on the face E 111. Since a dual wavelength coating having a higher transmittance for the wavelength 1064 nm and a higher reflectance for the wavelength 532 nm is applied to the face E 111, the fundamental wave light 10 of the wavelength 1064 nm is emitted through the face E 111 outside the wavelength conversion crystal 100. On the other hand, the second harmonic light 20 of the wavelength 532 nm is reflected from the two faces of the face D 110 and the face E 111 to be the outgoing second harmonic light 22 with the direction of travel folded. Here, since the orientations of the face D 110 and the face E 111 are formed as described above in the wavelength conversion crystal 100 of Embodiment 5, the propagation orientation of the outgoing second harmonic light 22 is described as $(\Theta, \phi) = (61.9 \text{ deg}, 45.0 \text{ deg})$ in the polar coordinates of $\Theta, \phi$ based on the dielectric principal axes of the CLBO crystal 100, which coincides with the type-I phase-matching orientation for the second wavelength conversion which generates the second harmonic from the fundamental wave of the wavelength 532 nm at the crystal temperature of 150° C.

Also, since the orientation of the first reflective face (face D) is formed as described above, it is theoretically possible to polarize 96% or more of the polarized component of the second harmonic light 20, which is to be incident on the face D 110, into the extraordinary ray direction in the propagation process from the face D 110 to the face E 111. Further, since the second reflective face E 111 is formed as described above, it is theoretically possible to polarize 99% or more of the extraordinary ray component reflected from the second reflective face E 111 into the ordinary ray direction which corresponds to the phase-matching condition for the second wavelength conversion in the phase-matching orientation of the second wavelength conversion, so that the second wavelength conversion can be efficiently performed. In other words, it is theoretically possible to polarize 95% or more of the second harmonic light 20 which is generated by the first wavelength conversion into the polarization direction 23 described as $(\Theta, \phi) = (90.0 \text{ deg}, -45.0 \text{ deg})$ in the polar coordinates of $\Theta, \phi$ based on the dielectric principal axes of the CLBO crystal.

Since this polarization direction coincides with the ordinary ray in the phase-matching orientation of the second wavelength conversion, the propagation orientation and the polarization direction 23 of the outgoing second harmonic light 22 correspond to the type-I phase-matching conditions for the second wavelength conversion which generates the second harmonic from the fundamental wave of the wavelength 532 nm at the crystal temperature of 150° C. Therefore, even by using the wavelength conversion crystal 100 formed as described above, the incident fundamental wave light 10 of the wavelength 1064 nm can be efficiently converted into the fourth harmonic light 40 of the wavelength 266 nm by using the single wavelength conversion crystal 100, as described in Embodiments 1 to 4. However, since the polarization direction 41 of the fourth harmonic light 40 according to this embodiment is an extraordinary ray in the phase-matching orientation for the second wavelength conversion, it forms an angle of 41.53 degrees with respect to the normal of the face B 108 of the wavelength conversion crystal 100.

As shown in Embodiment 5, even by using the type-II phase-matching for the first wavelength conversion, it is not only possible to obtain the same effect as that in Embodiments 1 to 4 but also possible to use a randomly polarized fundamental wave light as the light to be wavelength-converted. Therefore, any unit of selecting the linearly polarized light can be omitted for the fundamental wave light source and it is no need to match the polarization with the phase-matching conditions when allowing the fundamental wave light to enter the wavelength conversion crystal, thereby making it easy to adjust the incident light.

Further, when the CLBO crystal is used as the wavelength conversion crystal, an effective nonlinear optical coefficient in the type-I phase-matching is 0.38 pm/V whereas an effective nonlinear optical coefficient in the type-II phase-matching is 0.68 pm/V, for the second harmonic generation from the fundamental wave of the wavelength 1064 nm. Therefore, significant effect of further improving the wavelength conversion efficiency in the second harmonic generation when using the type-II phase-matching for the first wavelength conversion can be achieved.

(Embodiment 6)

Figure 10:
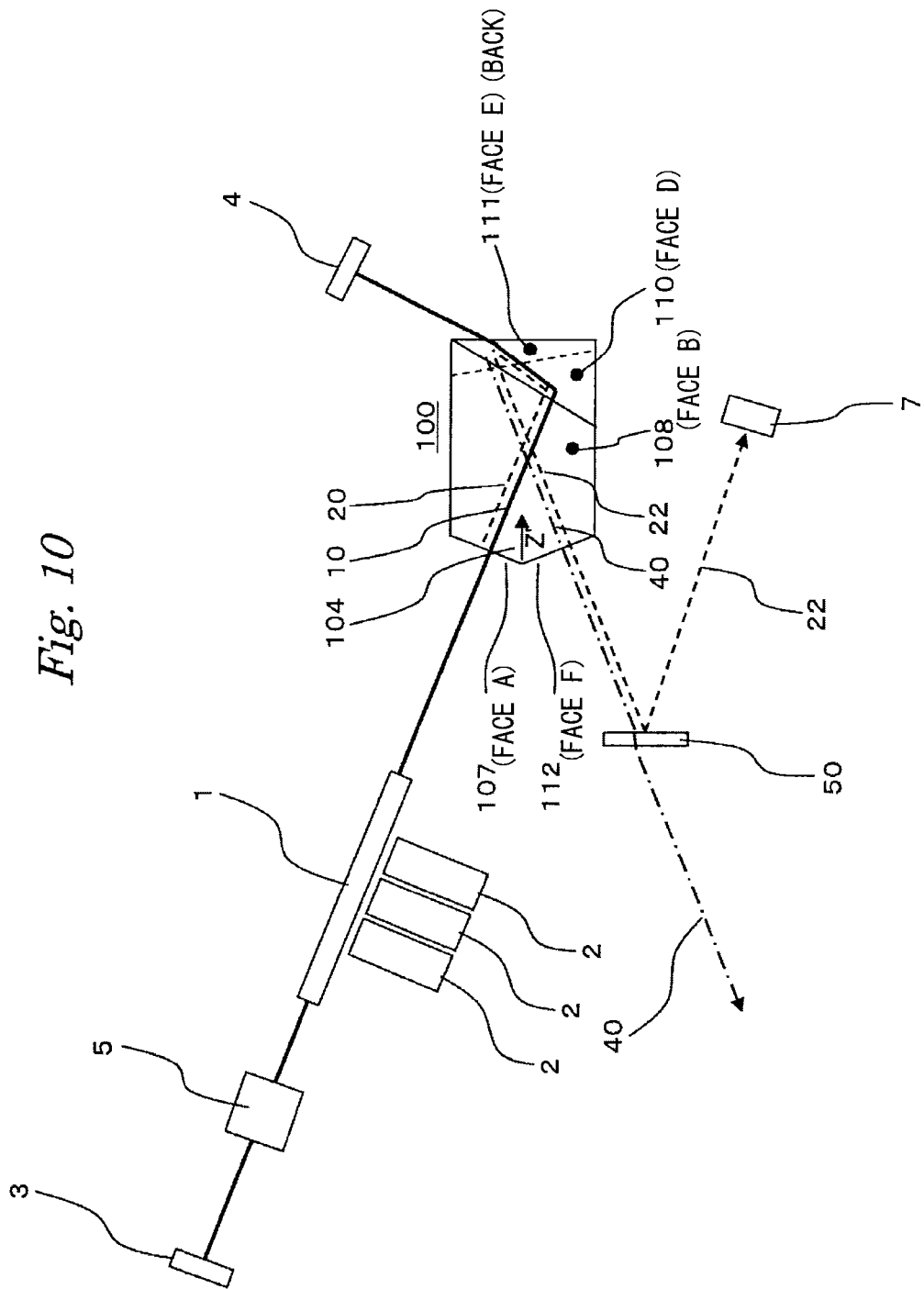
FIG. 10 is a schematic diagram illustrating a configuration of a wavelength conversion laser device according to Embodiment 6 of the present invention.

FIG. 10 is a schematic diagram illustrating a configuration of a wavelength conversion laser device according to Embodiment 6 of the present invention. The wavelength conversion laser device described in this embodiment uses such a wavelength conversion crystal 100 which has the same orientations of the respective faces formed as those in Embodiment 5 illustrated in FIGS. 7 to 9. Although not shown in the figures, the CLBO crystal, which can act as the wavelength conversion crystal 100 according to Embodiment 5, has a temperature around 150° C. maintained by a heater and a temperature adjustment mechanism and is also provided with an adjustment mechanism which can adjust the installation angle of the crystal. A dual wavelength coating having a higher transmittance for both of the wavelength 1064 nm and the wavelength 532 nm is applied to the face A 107 of the wavelength conversion crystal 100 according to this embodiment. An anti-reflection coating for the wavelength 266 nm is applied to the face F 112. A dual wavelength coating having a higher transmittance for the wavelength 1064 nm and a higher reflectance for the wavelength 532 nm is applied to the face E 111.

Also the wavelength conversion laser device according to Embodiment 6, as described in Embodiment 4, has the wavelength conversion crystal 100 installed inside the optical resonator of the wavelength conversion laser device which generates the fundamental wave light 10, and the optical axis of the fundamental wave light 10 in the wavelength conversion crystal 100 coincides with the type-II phase-matching orientation for the first wavelength conversion which generates the second harmonic from the fundamental wave of the wavelength 1064 nm at the crystal temperature of 150° C.

Also Embodiment 6 not only has effect of effectively improving the wavelength conversion efficiencies from the fundamental wave light 10 into the incoming second harmonic light 20 and from the outgoing second harmonic light 22 into the fourth harmonic light 40, as described in Embodiment 4, but also making the adjustment easier and, in addition, lowering the cost of the wavelength conversion laser device since it accepts the randomly polarized light for the fundamental wave light 10, hence, the polarization selective element which defines the polarization direction of the fundamental wave light 10 can be omitted. Further, since it is no need to select linearly polarized light in generating the fundamental wave light 10, the resonator loss can be reduced due to depolarization so that it can efficiently generate the fundamental wave light 10, and accordingly, effectively improve the wavelength conversion efficiency from the fundamental wave light 10 into the second harmonic light 20 and the fourth harmonic light 40.

(Embodiment 7)

Figure 11:
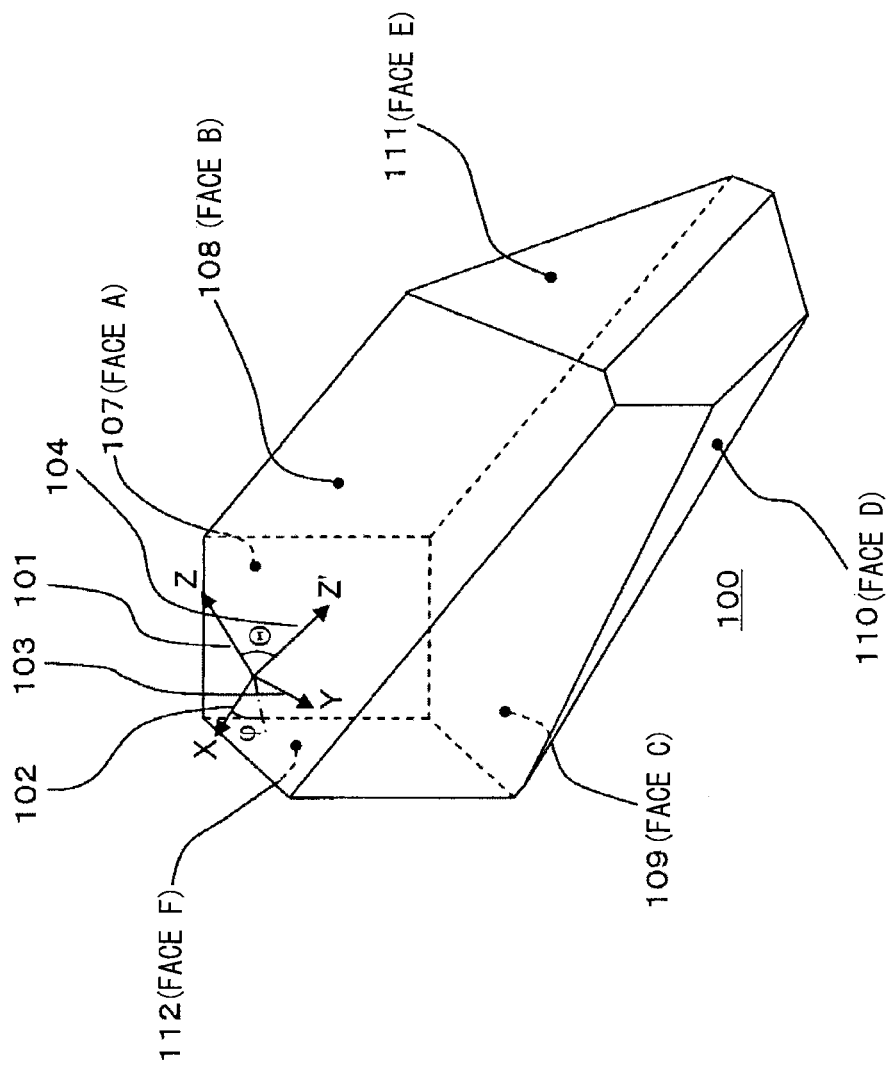
FIG. 11 is a perspective view illustrating a configuration of a wavelength conversion crystal according to Embodiment 7 of the present invention.

FIG. 11 is a perspective view illustrating a configuration of a wavelength conversion crystal 100 according to Embodiment 7 of the present invention. In FIG. 11, the same numerals as those in FIGS. 1 to 10 denote the same parts as or equivalent to those in FIGS. 1 to 10. In Embodiment 7, a lithium triborate crystal (LBO crystal: $LiB_3O_5$) whose temperature is controlled to 27° C., nearly the room temperature, is used for the wavelength conversion crystal 100. Embodiment 7 exemplifies a configuration of performing the second harmonic generation as the first wave conversion from a fundamental wave of the wavelength 1064 nm by using the type-I phase-matching and performing the sum-frequency generation as the second wave conversion by using the type-II phase-matching for the wavelength 1064 nm and the wavelength 532 nm to convert the fundamental wave light of the wavelength 1064 nm into third harmonic light of the wavelength 355 nm by using the single wavelength conversion crystal 100.

In FIG. 11, an arrow 104 represents a Z'-axis corresponding to a main propagation direction of the light in the wavelength conversion crystal 100. In this embodiment, the type-I phase-matching orientation for the first wavelength conversion which generates the second harmonic from the fundamental wave of the wavelength 1064 nm at the crystal temperature of 27° C. is $(\Theta, \phi)=$(90.0 deg, 11.3 deg) in a polar coordinates of $\Theta, \phi$ based on the dielectric principal axes. Further, the type-II phase-matching orientation for the second wavelength conversion for the sum-frequency generation of the wavelength 1064 nm and the wavelength 532 nm at the crystal temperature of 27° C. is $(\Theta, \phi)=$(42.6 deg, 90.0 deg) in the polar coordinates of $\Theta, \phi$ based on the dielectric principal axes. Therefore, the orientation of the Z'-axis 104 is defined by the intermediate orientation between the phase-matching orientation for the first wavelength conversion and the phase-matching orientation for the second wavelength conversion as $(\Theta, \phi)=$(60.72 deg, 41.67 deg) in the polar coordinates of $\Theta, \phi$ based on dielectric principal axes.

Further, in the wavelength conversion crystal 100, the normal direction of the face A 107 coincides with the phase-matching orientation of the first wavelength conversion and has the normal direction of the face F 112 coincides with the phase-matching orientation of the second wavelength conversion. The face B 108 is a plane parallel to both of the phase-matching orientation for the first wavelength conversion and the phase-matching orientation for the second wavelength conversion as in Embodiments 1 to 7. The face C 109 is formed parallel to the face B 108.

Next, the orientations of the respective faces formed on the wavelength conversion crystal 100 according to Embodiment 7 will be described in detail by using the Cartesian coordinate system XYZ and the polar coordinate system $\Theta\phi$ based on the dielectric principal axes of the wavelength conversion crystal 100.

Since the normal direction of the face A 107 coincides with the type-I phase-matching orientation for the first wavelength conversion which generates the second harmonic from the fundamental wave of the wavelength 1064 nm at the crystal temperature of 27° C., it is described as (X, Y, Z)=(0.9806, 0.1959, 0) in terms of the Cartesian coordinate system XYZ and $(\Theta, \phi)=$(90.0 deg, 11.3 deg) in terms of the polar coordinate system $\Theta\phi$.

Since the face B 108 and the face C 109 which is parallel thereto are also parallel to both of the phase-matching orientation for the first wavelength conversion and the phase-matching orientation for the second wavelength conversion, the normal direction of the face B 108 and the face C 109 is described as (X, Y, Z)=(0.1455, −0.7283, 0.6697) in terms of the Cartesian coordinate system XYZ and $(\Theta, \phi)=$(47.96 deg, −78.70 deg) in terms of the polar coordinate system $\Theta\phi$.

The normal direction of the first reflective face D 110 is described as (X, Y, Z)=(−0.6654, −0.1326, 0.7346) in terms of the Cartesian coordinate system XYZ and $(\Theta, \phi)=$(42.72 deg, −168.73 deg) in terms of the polar coordinate system $\Theta\phi$.

The normal direction of the second reflective face E 111 is described as (X, Y, Z)=(0.0416, 0.3709, 0.9277) in terms of the Cartesian coordinate system XYZ and $(\Theta, \phi)=$(21.92 deg, 83.60 deg) in terms of the polar coordinate system $\Theta\phi$.

Here, an anti-reflection coating for the wavelength 1064 nm is applied to the face A 107 of the wavelength conversion crystal 100 according to Embodiment 7 and an anti-reflection coating for the wavelength 355 nm is applied to the face F 112. A dual wavelength coating having a higher reflectance for both of the wavelength 1064 nm and the wavelength 532 nm is applied to the face D 110 and the face E 111.

Figure 12:
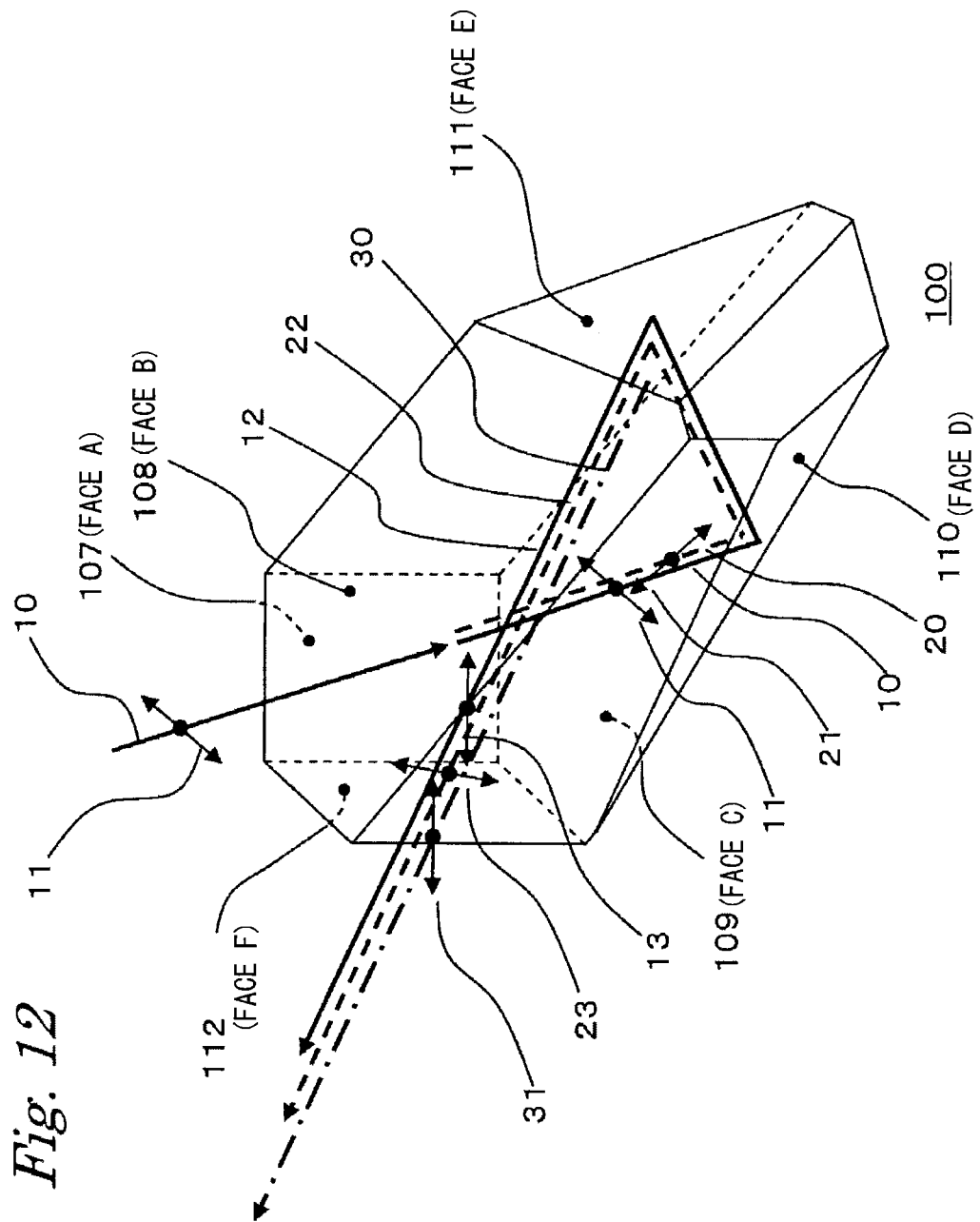
FIG. 12 is a perspective view schematically illustrating a propagation direction and a polarization direction of light in the wavelength conversion crystal according to Embodiment 7 of the present invention.
Figure 13:
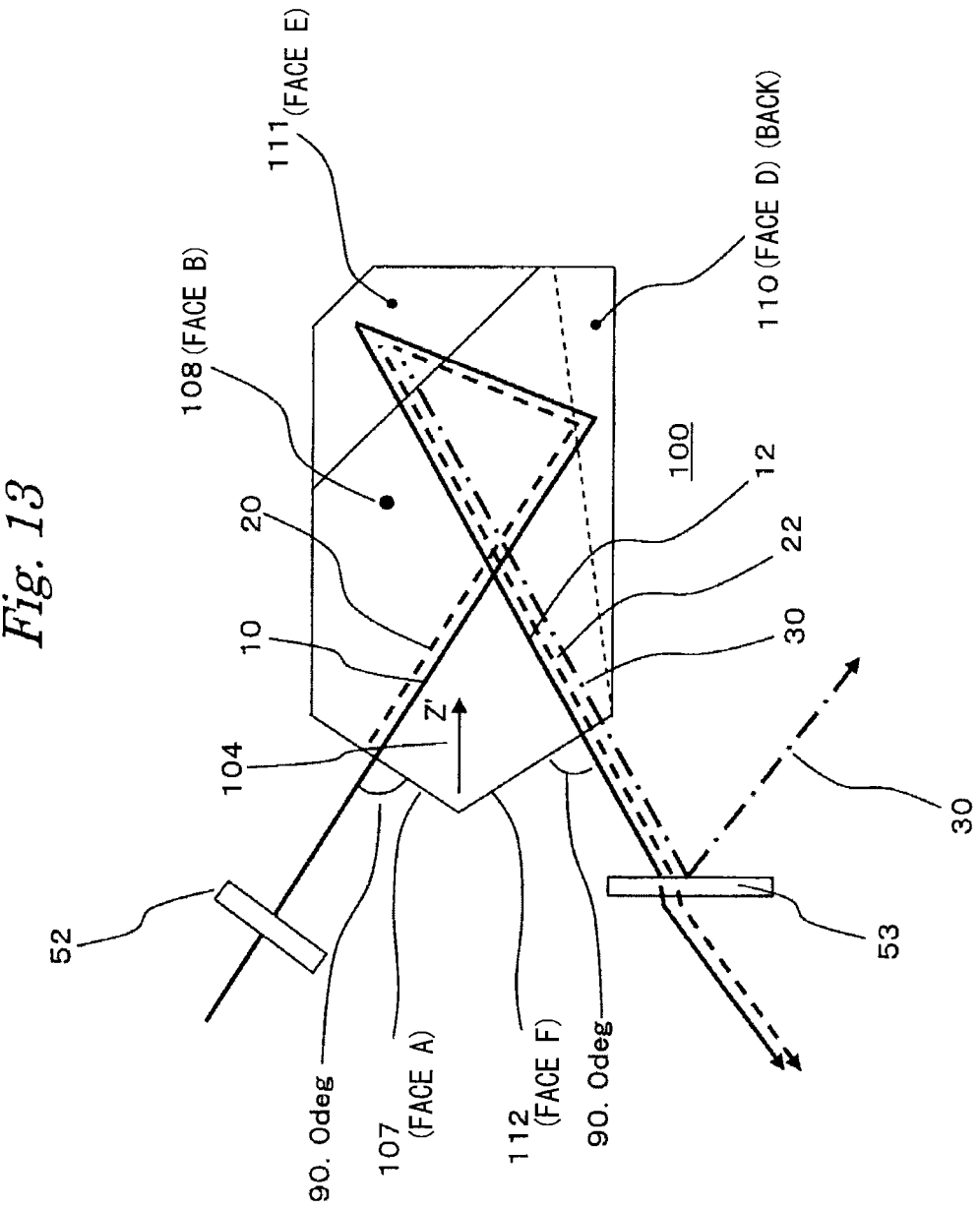
FIG. 13 is a schematic diagram illustrating the propagation direction and the polarization direction of light in the wavelength conversion crystal according to Embodiment 7 of the present invention, as viewed from a normal direction of a face B.

Next, a wavelength converting method by using the wavelength conversion crystal 100 according to Embodiment 7 will be described with reference to FIGS. 12 and 13. FIG. 12 is a perspective view schematically illustrating a propagation direction and a polarization direction of light in the wavelength conversion crystal 100 according to Embodiment 7. FIG. 13 is a schematic diagram illustrating the propagation direction and the polarization direction of light in the wavelength conversion crystal 100 according to Embodiment 7, as viewed from the normal direction of the face B 108. In FIGS.

12 and 13, the same numerals as those in FIGS. 1 to 11 denote the same parts as or equivalent to those in FIGS. 1 to 11.

In the wavelength conversion crystal 100 of Embodiment 7, since the normal direction of the face A 107 coincides with the phase-matching orientation of the first wavelength conversion, the fundamental wave light 10 of the wavelength 1064 nm may be perpendicularly incident on the face A 107. However, when the fundamental wave light 10 is incident on the face A 107 of the wavelength conversion crystal 100, the polarization direction 11 of the fundamental wave light 10 is required to coincide with the phase-matching condition for the first wavelength conversion.

For the first wavelength conversion which generates the second harmonic from the fundamental wave of the wavelength 1064 nm at the crystal temperature of 27° C. by the type-I phase-matching, the polarization direction 11 of the fundamental wave light 10 needs to coincide with the ordinary ray direction with respect to the phase-matching orientation. The LBO crystal is a biaxial optical crystal and a main converting plane of the first wavelength conversion can be described as XY plane in terms of the dielectric principal axes. Therefore, the polarization direction of the ordinary ray of the first wavelength conversion is parallel to a Z-axis of the dielectric principal axes. As a result, the polarization direction 11 of the fundamental wave light 10 entering the wavelength conversion crystal 100 may be rotated by 47.96 degrees counterclockwise around the normal direction of the face B 108, as viewed in the direction of travel of the fundamental wave light 10. In practice, as illustrated in FIG. 13, a polarization direction adjustment unit 52 is provided somewhere before the fundamental wave light 10 is incident on the wavelength conversion crystal 100, so that the polarization direction of the fundamental wave light 10 can be adjusted so as to produce the maximum output of the third harmonic light 30 of the wavelength 355 nm generated by the second wavelength conversion of Embodiment 7. Meanwhile, in Embodiment 7, a transmission type of half-wave plate for the wavelength 1064 nm is used as the polarization direction adjustment unit 52. Although not shown in the figure, the half-wave plate used for the polarization direction adjustment unit 52 is provided with a rotation mechanism around the fundamental wave light 10.

Since the phase-matching condition for the first wavelength conversion is satisfied by allowing the fundamental wave light 10 to enter the wavelength conversion crystal 100 in such a manner as described above, the fundamental wave light 10 can be efficiently converted into the second harmonic light 20 of the wavelength 532 nm. Since the fundamental wave light 10 and the second harmonic light 20 have the same propagation orientation in the wavelength conversion crystal 100 while the polarization direction 11 of the fundamental wave light 10 is an ordinary ray and the polarization direction 21 of the second harmonic light 20 is an extraordinary ray, the polarization direction 11 of the fundamental wave light 10 is parallel to an optic axis Z 101. On the other hand, the polarization direction 21 of the second harmonic light 20 is described as $(\Theta, \phi)=(90.0$ deg, $101.3$ deg) in the polar coordinates of $\Theta, \phi$ based on the dielectric principal axes of the LBO crystal.

A dual wavelength coating having a higher reflectance for both of the wavelength 1064 nm and the wavelength 532 nm is applied to the face D 110 and the face E 111 of the wavelength conversion crystal 100 according to this embodiment. Therefore, both of the fundamental wave light 10 of the wavelength 1064 nm and the second harmonic light 20 of the wavelength 532 nm are twice reflected by the face D 110 and the face E 111 to be the outgoing fundamental wave light 12 and the outgoing second harmonic light 22 with their directions of travel folded, propagating in the same orientation. Here, since the orientations of the face D 110 and the face E 111 are formed as described above in the wavelength conversion crystal 100 of Embodiment 7, the propagation orientation of the outgoing fundamental wave light 12 and the outgoing second harmonic light 22 is described as $(\Theta, \phi)=(42.6$ deg, $90.0$ deg) in the polar coordinates of $\Theta, \phi$ based on the dielectric principal axes of the LBO crystal, which coincides with the type-II phase-matching orientation for the second wavelength conversion for the sum-frequency generation of the wavelength 1064 nm and the wavelength 532 nm at the crystal temperature of 27° C.

Also, since the face D 110 is formed as described above, it is theoretically possible to polarize 99% or more of the fundamental wave light 10, which is reflected from the face D 110, into the extraordinary ray direction in the propagation process from the face D 110 to the face E 111 and to polarize 99% or more of the second harmonic light 20, which is reflected from the face D 110, into the ordinary ray direction in the propagation process from the face D 110 to the face E 111. Further, since the face E 111 is formed as described above, it is theoretically possible to polarize 99% or more of the ordinary ray, which is reflected from the face E 110, into the extraordinary ray direction in the phase-matching orientation for the second wavelength conversion and to polarize 99% or more of the extraordinary ray, which is reflected from the face E 110, into the ordinary ray direction in the phase-matching orientation for the second wavelength conversion.

Therefore, with the face D 110 and the face E 111 for reflecting the light twice, it is theoretically possible to polarize 98% or more of the second harmonic light 20, which is emitted by the first wavelength conversion, into the polarization direction 23 described as $(\Theta, \phi)=(47.4$ deg, $-90.0$ deg) in the polar coordinates of $\Theta, \phi$ based on the dielectric principal axes and to polarize 98% or more of the fundamental wave light 10, which is left after the first wavelength conversion, into the polarization direction 13 described as $(\Theta, \phi)=(90.0$ deg, $0.0$ deg) in the polar coordinates of $\Theta, \phi$ based on the dielectric principal axes.

Since the main converting plane of the second wave conversion is a YZ plane so that the polarization direction 13 of 98% or more of the outgoing fundamental wave 12 is theoretically the ordinary ray while the polarization direction 23 of 98% or more of the outgoing second harmonic light 22 is theoretically the extraordinary ray, both of the propagation orientation and the polarization direction of the outgoing fundamental wave light 12 and the outgoing second harmonic light 22 correspond to the type-II phase-matching conditions for the second wavelength conversion for the sum-frequency generation of the wavelength 1064 nm and the wavelength 532 nm at the crystal temperature of 27° C. Therefore, the fundamental wave light 10 of the wavelength 1064 nm, which is an incident light, can be efficiently converted into the third harmonic light 30 of the wavelength 355 nm by using the single wavelength conversion crystal 100. Meanwhile, since the third harmonic light 30 generated by the second wavelength conversion is the ordinary ray, the polarization direction 31 of the third harmonic light 30 is equal to the polarization direction 13 of the outgoing fundamental wave light 12. The third harmonic light 30 emitted outside the wavelength conversion crystal 100 can be easily separated by using a triple wavelength mirror 53 which can transmit both of the wavelength 1064 nm and the wavelength 532 nm and reflect the wavelength 355 nm.

It is needless to say that when the wavelength conversion crystal 100 described in Embodiment 7 is installed inside the optical resonator of the wavelength conversion laser device, the wavelength conversion efficiency can be improved as in Embodiments 4 and 7. Further, in Embodiment 7, since the fundamental wave light 12 of the wavelength 1064 nm is also used for the sum-frequency generation which is the second wavelength conversion, the wavelength conversion efficiency can be further improved by performing both of the first wavelength conversion and the second wavelength conversion inside the optical resonator of the wavelength conversion laser device.

As described in Embodiment 7, the second wavelength conversion scheme is not limited to the second harmonic generation and the sum-frequency of the second harmonic generated by the first wavelength conversion and the fundamental wave may be generated. Further, if a third wavelength conversion scheme is available at the same temperature, it is also theoretically possible to realize three or more stepped wavelength conversion using a single wavelength conversion crystal by adding a reflective face to the wavelength conversion crystal as required with the reflective faces oriented appropriately to make the orientation and the polarization direction of the reflected light correspond to the phase-matching conditions of the third wavelength conversion scheme. When the CLBO crystal described in the above embodiments is used, it is also possible to generate a fifth harmonic of the wavelength 213 nm using a single wavelength conversion crystal by forming the respective faces of the wavelength conversion crystal in appropriate orientations to realize three stepped wavelength conversion in a single wavelength conversion crystal.

Although the above embodiments exemplify configurations of using the CLBO crystal or the LBO crystal for the wavelength conversion crystal, the kind of crystal, the wavelength, and the wavelength conversion scheme are not limited to them. When the respective faces of the wavelength conversion crystal are formed in appropriate orientations to be used as the reflective faces, a single wavelength conversion crystal can realize two or more stepped wavelength conversion which employs various wavelength conversion schemes enabling the phase-matching at the same temperature such as harmonics, sum-frequency, and difference frequency.

Although the above embodiments exemplify configurations of the fundamental wave of a single wavelength entering the wavelength conversion crystal, it is also possible to guide a plurality of light beams of two or more wavelengths to be wavelength-converted into the wavelength conversion crystal to generate the sum frequency or the difference frequency as the first wavelength conversion and to further generate the harmonic of the sum frequency or the difference frequency generated in the first wave conversion by the second wavelength conversion, or to generate the harmonic from one of the light beams to be wavelength-converted by the first wavelength conversion and to generate the sum frequency or the difference frequency from the harmonic generated by the first wavelength conversion and another light beam to be wavelength-converted by the second wavelength conversion.

[Industrial Applicability]

The present invention is quite useful in industrial purposes in that it can efficiently generate a third or higher-order harmonic with a reliable and simple configuration

[Explanatory Note]

1 SOLID-STATE LASER MEDIUM
2 SEMICONDUCTOR LASER
3 FIRST REFLECTING MIRROR
4 SECOND REFLECTING MIRROR
5 Q-SWITCHING ELEMENT
6 POLARIZATION SELECTIVE ELEMENT
7 DAMPER
10 FUNDAMENTAL WAVE LIGHT
11 POLARIZATION DIRECTION OF FUNDAMENTAL WAVE LIGHT
12 OUTGOING FUNDAMENTAL WAVE LIGHT
13 POLARIZATION DIRECTION OF OUTGOING FUNDAMENTAL WAVE LIGHT
20 INCOMING SECOND HARMONIC LIGHT,
21 POLARIZATION DIRECTION OF INCOMING SECOND HARMONIC LIGHT
22 OUTGOING SECOND HARMONIC LIGHT
23 POLARIZATION DIRECTION OF OUTGOING SECOND HARMONIC LIGHT
30 THIRD HARMONIC LIGHT
31 POLARIZATION DIRECTION OF THIRD HARMONIC LIGHT
40 FOURTH HARMONIC LIGHT
41 POLARIZATION DIRECTION OF FOURTH HARMONIC LIGHT
50 DUAL WAVELENGTH MIRROR
51 HALF-WAVE PLATE
100 WAVELENGTH CONVERSION CRYSTAL
110 FIRST REFLECTIVE FACE (FACE D)
111 SECOND REFLECTIVE FACE (FACE E)
112 EXIT SURFACE OF HIGH-ORDER HARMONIC (FACE F)

The invention is claimed is:

1. A single wavelength conversion crystal which performs both of a first wavelength conversion and a second wavelength conversion, comprising:

a first optical path which can satisfy at a temperature T an angular phase-matching condition which is required for the first wavelength conversion to convert first wavelength light into second wavelength light; and a second optical path which can satisfy at the same temperature T an angular phase-matching condition which is required for the second wavelength conversion to convert the second wavelength light into third wavelength light, wherein the light is guided from the first optical path to the second optical path, a polarization direction of light suitable for the second wavelength conversion is selected due to reflection caused by two reflective faces having different orientations, and normal directions of said reflective faces are set so that a polarization direction of the second wavelength light generated by the first wavelength conversion on a propagation path between said reflective faces formed on the single wavelength conversion crystal is polarized to one of an ordinary ray and an extraordinary ray of the single wavelength conversion crystal.

2. The single wavelength conversion crystal according to claim 1, wherein the first wavelength conversion is to generate a second harmonic and the second wavelength conversion is to generate a fourth harmonic.

3. The single wavelength conversion crystal according to claim 2, wherein the single wavelength conversion crystal further includes a third optical path which can satisfy an angular phase-matching condition which is required for a third wavelength conversion to convert the fourth harmonic into a harmonic of a higher-order than the fourth harmonic, and the single wavelength conversion crystal further includes at least two reflective faces having different orientations, for reflecting the fourth harmonic, and the harmonic of the higher-order than the fourth harmonic is generated by the third wavelength conversion by allowing a propagation orientation and a polarization direction of a fourth wavelength light generated by the second wavelength conversion to coincide with those of the angular phase-matching condition using reflection from said at least two reflective faces.

4. The single wavelength conversion crystal according to claim 1, wherein the single wavelength conversion crystal is a cesium lithium borate-based crystal.

5. A single wavelength conversion crystal which performs both of a first wavelength conversion and a second wavelength conversion, comprising:

a first optical path which can satisfy at a temperature T an angular phase-matching condition which is required for the first wavelength conversion to convert first wavelength light into second wavelength light; and a second optical path which can satisfy at the same temperature T an angular phase-matching condition which is required for the second wavelength conversion to convert both of the first wavelength light and the second wavelength light into third wavelength light, wherein the light is guided from the first optical path to the second optical path, a polarization direction of light suitable for the second wavelength conversion is selected by both of the first wavelength light and the second wavelength light due to reflection caused by two reflective faces having different orientations, and normal directions of said reflective faces are set so that polarization directions of both the second wavelength light generated by the first wavelength conversion and the first wavelength light left after the first wavelength conversion on a propagation path between said reflective faces formed on the wavelength conversion crystal is polarized to one of an ordinary ray and an extraordinary ray of the wavelength conversion crystal.

6. The single wavelength conversion crystal according to claim 5, wherein the first wavelength conversion is to generate a second harmonic and the second wavelength conversion is to generate a third harmonic.

7. The single wavelength conversion crystal according to claim 6, wherein the single wavelength conversion crystal further includes a third optical path which can satisfy an angular phase-matching condition which is required for a third wavelength conversion to convert the third harmonic into a harmonic of a higher-order than the third harmonic, and the single wavelength conversion crystal further includes at least two reflective faces having different orientations, for reflecting the third harmonic, and the harmonic of the higher-order than the third harmonic is generated by the third wavelength conversion by allowing a propagation orientation and a polarization direction of the third wavelength light generated by the second wavelength conversion to coincide with those of the angular phase-matching condition using reflection from said at least two reflective faces.

8. The single wavelength conversion crystal according to claim 5, wherein the single wavelength conversion crystal is a lithium triborate-based crystal.

9. A wavelength conversion laser device comprising:
a laser source which emits laser light; and
the single wavelength conversion crystal according to claim 1, for performing wavelength conversion of the laser light.

10. The wavelength conversion laser device according to claim 9, wherein the laser source includes an optical resonator and a laser medium located inside the optical resonator, and said single wavelength conversion crystal is located inside the optical resonator, and an optical axis of the optical resonator is matched with at least a phase-matching orientation of the first wavelength conversion.

\* \* \* \* \*